United States Patent
Choi et al.

(10) Patent No.: US 11,158,072 B2
(45) Date of Patent: Oct. 26, 2021

(54) INTELLIGENT DISHWASHING SYSTEMS AND METHODS

(71) Applicant: Dishcraft Robotics, Inc., San Carlos, CA (US)

(72) Inventors: Kerkil Choi, Los Gatos, CA (US); Paul M. Birkmeyer, San Carlos, CA (US); Paul Baumgart, San Carlos, CA (US); Kenneth M. Peters, San Mateo, CA (US)

(73) Assignee: Dishcraft Robotics, Inc., San Carlos, CA (US)

( * ) Notice: Subject to any disclaimer, the term of this patent is extended or adjusted under 35 U.S.C. 154(b) by 0 days.

(21) Appl. No.: 15/887,566

(22) Filed: Feb. 2, 2018

(65) Prior Publication Data

US 2019/0244375 A1    Aug. 8, 2019

(51) Int. Cl.
*G06T 7/44* (2017.01)
*G06T 7/00* (2017.01)
(Continued)

(52) U.S. Cl.
CPC ............ *G06T 7/44* (2017.01); *A47L 15/4295* (2013.01); *G06N 3/04* (2013.01); *G06N 3/08* (2013.01); *G06T 7/0002* (2013.01); *G06T 7/12* (2017.01); *G06T 7/174* (2017.01); *A47L 2401/04* (2013.01); *G06T 2207/10048* (2013.01); *G06T 2207/10064* (2013.01); *G06T 2207/10152* (2013.01); *G06T 2207/20081* (2013.01);
(Continued)

(58) Field of Classification Search
CPC .. G06T 7/44; G06T 7/12; G06T 7/174; G06T 7/0002; G06T 2207/10048; G06T 2207/10064; G06T 2207/10152; G06T 2207/20081; G06T 2207/20084; G06T 2207/30244; G06T 7/0006; A47L 15/4295; A47L 2401/04; A47L 15/0057; A47L 15/4276; G06N 3/04; G06N 3/08; G06K 9/2027; B07C 5/342; G01N 21/3563; G01N 21/64; G01N 21/65; G01J 3/0218; G01J 3/0224
See application file for complete search history.

(56) References Cited

U.S. PATENT DOCUMENTS 4,713,781 A    12/1987  Brizgis
4,866,283 A    9/1989   Hill, Jr.
(Continued)

FOREIGN PATENT DOCUMENTS

DE    10048081 A1    4/2002
EP    1635167 A1     3/2006

OTHER PUBLICATIONS

Fresnel diffraction, Wikipedia, 2020 https://en.wikipedia.org/wiki/Fresnel_diffraction (Year: 2020).*
(Continued)

*Primary Examiner* — Jianxun Yang
(74) *Attorney, Agent, or Firm* — Loza & Loza, LLP

(57) ABSTRACT

Example intelligent dishwashing systems and methods are described. In one implementation, a system includes a light source that is configured to illuminate an article of dishware. An imaging system is configured to capture at least one image of the article of dishware. A processing system is configured to analyze the at least one image to determine a presence of a stain on the article of dishware.

17 Claims, 18 Drawing Sheets

(51) Int. Cl.
*G06T 7/12* (2017.01)
*G06T 7/174* (2017.01)
*A47L 15/42* (2006.01)
*G06N 3/04* (2006.01)
*G06N 3/08* (2006.01)

(52) U.S. Cl.
CPC .............. *G06T 2207/20084* (2013.01); *G06T 2207/30244* (2013.01)

(56) References Cited

U.S. PATENT DOCUMENTS

| | | |
|---|---|---|
| 4,884,696 A | 12/1989 | Peleg |
| 6,433,293 B1 | 8/2002 | Bollinger |
| 6,610,953 B1 * | 8/2003 | Tao .......................... B07C 5/342 209/11 |
| 8,719,998 B1 | 5/2014 | Huffman |
| 2004/0247170 A1 * | 12/2004 | Furze ....................... G01B 11/25 382/141 |
| 2006/0086912 A1 | 4/2006 | Weir et al. |
| 2006/0180775 A1 | 8/2006 | Paradis |
| 2010/0043834 A1 | 2/2010 | Scheringer |
| 2010/0328476 A1 * | 12/2010 | Wagner ................ G06K 9/2027 348/222.1 |
| 2012/0138092 A1 | 6/2012 | Ashrafzadeh et al. |
| 2012/0138820 A1 * | 6/2012 | Plese ...................... G01N 21/64 250/459.1 |
| 2013/0196443 A1 * | 8/2013 | Aalders ................. G01J 3/0218 436/66 |
| 2014/0027649 A1 | 1/2014 | Kayani |
| 2015/0023553 A1 * | 1/2015 | Rosario .............. G06K 9/00624 382/103 |
| 2016/0093412 A1 | 3/2016 | Liao |
| 2017/0202426 A1 | 7/2017 | Bosen et al. |
| 2019/0045998 A1 * | 2/2019 | Calvimontes ....... A47L 15/0057 |

OTHER PUBLICATIONS

Metz, C., "MIT Researchers want to teach robots how to wash dishes", Wired, Jan. 8, 2016; downloaded Mar. 19, 2019: https://www.wired.com/2016/01/mit-researchers-are-figuring-out-how-robots-can-wash-dishes/, 3 pages.

* cited by examiner

INTELLIGENT DISHWASHING SYSTEMS AND METHODS

RELATED APPLICATIONS

This application is related to U.S. application Ser. No. 15/887,686 filed Feb. 2, 2018, which is incorporated herein by reference for all purposes.

TECHNICAL FIELD

The present disclosure relates to dishwashing systems and methods that use imaging systems and associated image analysis methods to determine a presence of a stain or a defect on an article of dishware.

BACKGROUND

A process of automated dishwashing entails an article of dishware being placed into a dishwashing system, where the article of dishware is typically washed and rinsed with a combination of water and other cleaning agents. In some cases, a single wash cycle may be insufficient to remove all existing soils or stains on the article of dishware. Furthermore, the dishwashing system may not be configured to detect whether the article of dishware is stained or soiled (either pre-wash or post-wash), or whether the article of dishware is damaged or defective. There exists a need, therefore, for an intelligent dishwashing system that is enabled to determine a presence of a stain or soiling on an article of dishware during a pre-wash or post-wash phase, or to detect whether an article of dishware is defective or damaged.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
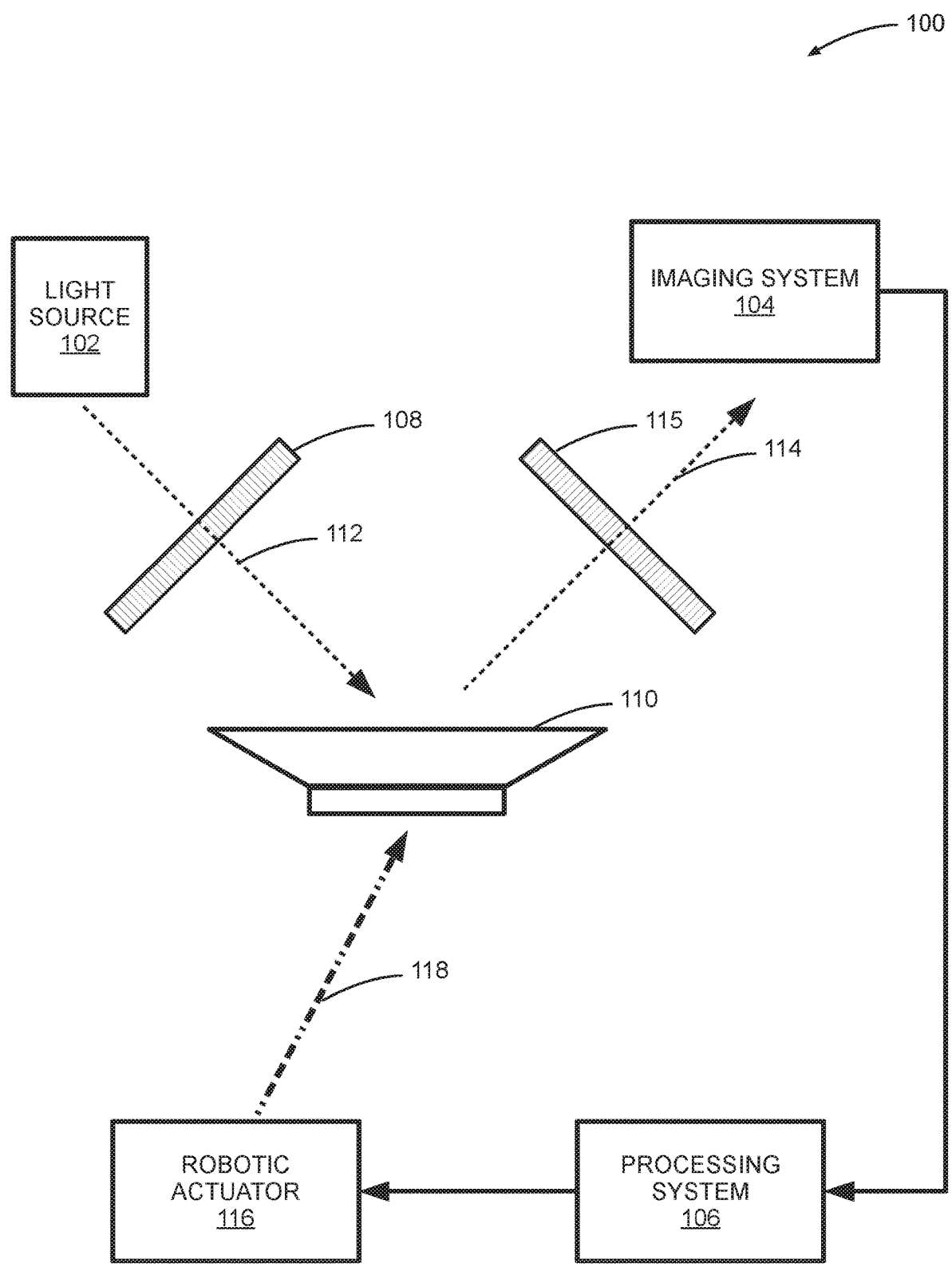
FIG. 1A is a schematic diagram depicting an embodiment of a stain detection system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The systems and methods described herein use one or more imaging systems and associated image analysis techniques to determine a presence of a stain or a defect on an article of dishware. In some embodiments, image analysis is performed by convolutional neural networks (CNNs). Particular embodiments include different light sources configured to illuminate an article of dishware to be imaged, or a plurality of optical filters configured to modify light illuminating the article of dishware or light reflected by the article of dishware. Some embodiments may include one or more robotic actuators configured to manipulate an article of dishware to be imaged, as described herein.

FIG. 1A is a schematic diagram depicting an embodiment of a stain detection system 100. In some embodiments, stain detection system 100 includes a light source 102 that is configured to illuminate an article of dishware 110. Article of dishware 110 is illuminated via an incident light path 112 corresponding to light emitted by light source 102. An optical filter 108 that is configured to modify characteristics of light emitted by light source 102 (such as light color, transmitted wavelength(s), or light intensity) may be placed in incident light path 112. (In other words, optical filter 108 is optically coupled to light source 102.) Light emitted by light source 102 incident on article of dishware 110 after passing through optical filter 108 is reflected in a view of an imaging system 104 via a reflected light path 114. An optical filter 115 may be introduced into reflected light path 114 to modify characteristics (such as light color, transmitted wavelength(s), or light intensity) of light traveling along reflected light path 114. (In other words, optical filter 115 is optically coupled to imaging system 104.) Examples of light sources such as light source 102, optical filters such as optical filter 108 and optical filter 115, and imaging systems such as imaging system 104 are provided herein.

In some embodiments, light traveling along reflected light path 114 is used by imaging system 104 after passing through optical filter 115, to capture one or more images of article of dishware 110. A processing system 106 coupled to imaging system 104 receives the one or more images, and processes the one or more images to determine (or detect) a presence of a stain or a defect on article of dishware 110. The term "stain" may be used interchangeably herein with terms such as "dirt", "spot", "soils", or other kinds of similar descriptors to designate soiling or stains on an article of dishware. Methods used by processing system 106 to accomplish stain detection or defect detection on article of dishware 110 are described herein. Stain detection system 100 may be used to assist an automated dishwashing machine in characterizing one or more stains on an article of dishware, thereby adding intelligence to associated dishwashing operations.

In some embodiments, processing system 106 is configured to command a robotic actuator 116 that is capable of manipulating article of dishware 110 via a mechanical coupling 118. Examples of robotic actuator 116 include a multi degree of freedom robotic arm, a gantry robot, a multi degree of freedom linear stage assembly, and so on. Examples of mechanical coupling 118 include grippers, vices, clamps, and other similar gripping mechanisms. Robotic actuator 116 is configured to, for example, change a pose or a physical orientation of article of dishware 110 with respect to imaging system 104, so that different portions of article of dishware 110 are presented in a field of view of imaging system 104. In particular embodiments, robotic actuator 116 changes the physical orientation of article of dishware 110 responsive to inputs from processing system 106. Changing the physical orientation of article of dishware 110 with respect to imaging system 104 allows different portions of article of dishware 110 to be imaged by imaging system 104 which, in turn, allows all of article of dishware 110 to be imaged over a series of multiple images of article of dishware 110 as captured by imaging system 104.

Figure 1B:
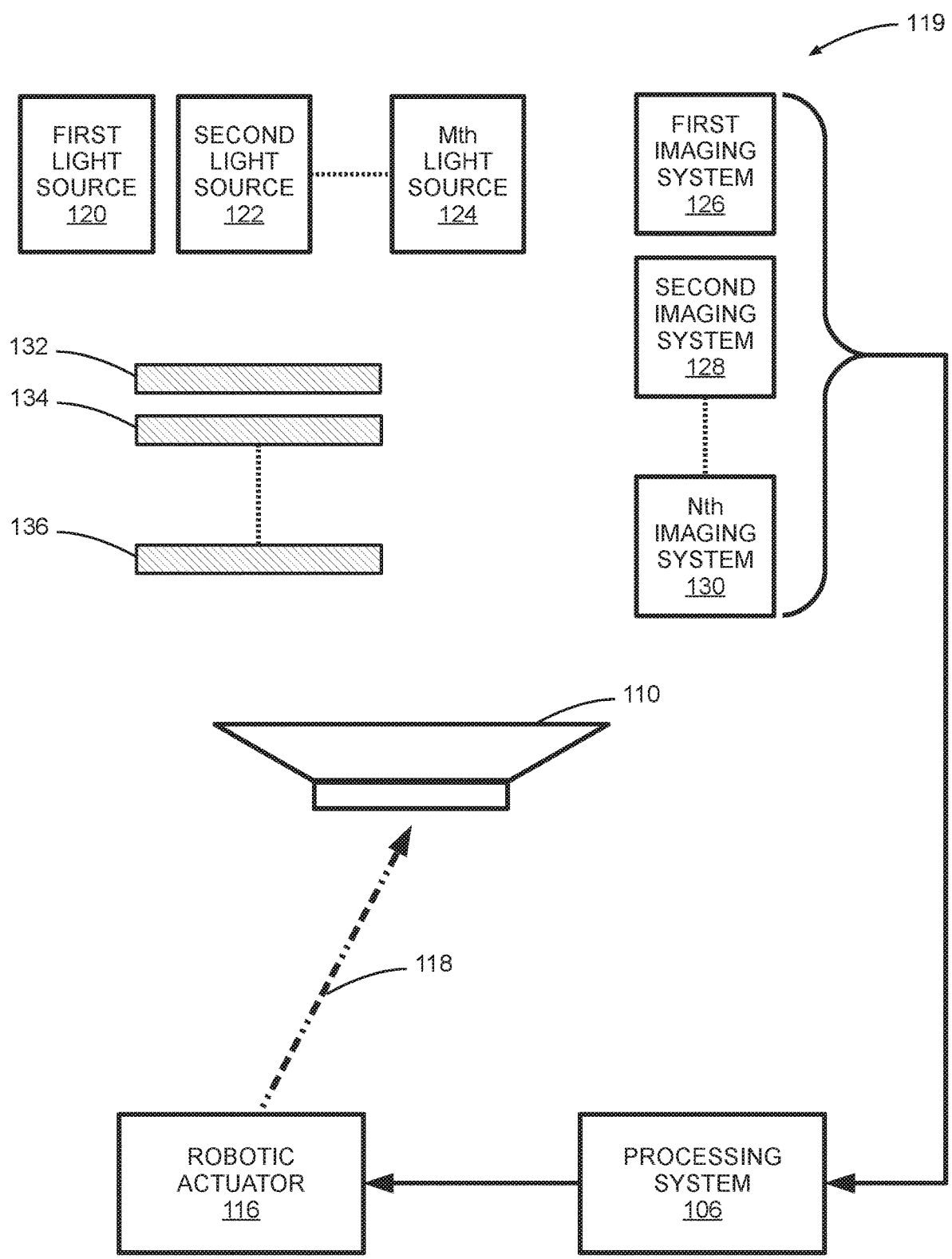
FIG. 1B is a schematic diagram depicting another embodiment of a stain detection system.

FIG. 1B is a schematic diagram depicting an embodiment of a stain detection system 119. In some embodiments, stain detection system 119 includes a first light source 120, a second light source 122, through an Mth light source 124. Each of first light source 120 through Mth light source 124 is configured to illuminate an article of dishware such as article of dishware 110. In some embodiments, each of first light source 120 through Mth light source 124 is configured to output light of a specific frequency, intensity and wavelength. In some embodiments, first light source 120 through Mth light source 124 may illuminate article of dishware 110 simultaneously. In other embodiments, some combination of first light source 120 through Mth light source 124 may be used to illuminate article of dishware 110.

In some embodiments, a set of imaging systems comprising a first imaging system 126, a second imaging system 128, through an Nth imaging system 130 are each configured to capture one or more images of light reflecting off of article of dishware 110, where the light reflecting off of article of dishware is generated by some combination of first light source 120 through Mth light source 124. One or more optical filters from a set of optical filters comprising an optical filter 132, an optical filter 134, through an optical filter 136 may be optically coupled to one or more of first light source 120 through Mth light source 124, or one or more of first imaging system 126 through Nth imaging system 130. Optical filter 132 through optical filter 136 are each configured to modify light passing through them, and may be used along an incident light path from first light source 120 through Mth light source 124 to article of dishware 110 (light path not shown), or along a reflected light path from article of dishware 110 to first imaging system 126 through Nth imaging system 130 (light path not shown). In some embodiments, optical filter 132 through optical filter 136 may be mechanically switchable in a sense that a filter may be physically placed in front of a light source or an imaging system for one set of images, and removed for another set of images by a mechanical actuation system that may include one or more robotic actuators or mechanical actuators (not shown) that are similar to robotic actuator 116.

In some embodiments, one subset of lights from a light set comprising first light source 120 through Mth light source 124 may be used to capture a first set of images by first imaging system 126 through Nth imaging system 130, while a second subset of lights from the light set comprising first light source 120 through Mth light source 124 may be used to capture a second set of images by first imaging system 126 through Nth imaging system 130, and so on. This process yields several sets of images where article of dishware is illuminated by different combinations of light sources, i.e., by light having different characteristics. This feature enables processing system 106 to implement different analysis techniques for dirt detection or defect detection as described herein.

In some embodiments, the sets of images captured by first imaging system 126 through Nth imaging system 130 are received by processing system 106 that is configured to process the one or more images to determine (or detect) a presence of a stain or a defect on article of dishware 110. Methods used by processing system 106 to accomplish stain detection or defect detection on article of dishware 110 are described herein.

In some embodiments, stain detection system 119 also includes robotic actuator 116 that can manipulate article of dishware 110 via mechanical coupling 118. Robotic actuator 116 is configured to, for example, change a pose or a physical orientation of article of dishware 110 with respect to first imaging system 126 through Nth imaging system 130, so that different portions of article of dishware 110 are presented in respective fields of view of first imaging system 126 through Nth imaging system 130. In particular embodiments, robotic actuator 116 changes the physical orientation of article of dishware 110 responsive to inputs from processing system 106. Changing the physical orientation of article of dishware 110 with respect to first imaging system 126 through Nth imaging system 130 allows different portions of article of dishware 110 to be imaged by first imaging system 126 through Nth imaging system 130 which, in turn, allows all of article of dishware 110 to be imaged over a series of multiple images of article of dishware 110 as captured by first imaging system 126 through Nth imaging system 130.

Embodiments of stain detection systems such as stain detection system 100 and stain detection system 119 described herein may use a single light source or multiple light sources combined with or more imaging systems, both of which may be optically coupled to mechanically-actuated optical filters. In some embodiments, the light sources, imaging systems, and optical filters are enclosed in a box to more tightly control image acquisition conditions such as lighting. This configuration of light sources, imaging systems, and optical filters enclosed in a box may be referred to as a "sensor." In some embodiments, articles of dishware are presented to the imaging systems by robotic actuators, and the imaging systems and the lights are on a mount reachable by the robotic actuators. The light sources can be any combination of visible lights, white lights, ultraviolet (UV) lights, and infrared (IR) lights to generate signals for a wide range dirt, soils, stains, and defects that may be encountered on an article of dishware. In some embodiments, the imaging systems (such as imaging system 104, first imaging system 126 through Nth imaging system 130, and other imaging systems described herein) can be any combination of normal RGB cameras (featured with high resolution and high dynamic range), UV cameras, IR cameras, and hyperspectral cameras for capturing diverse signal types to improve sensitivity and detectability of the signals.

Other embodiments of a sensor include UV lights and visible white lights combined with two cameras or more. Such embodiments utilize reflectance from food soils under visible white lights and fluorescence from food soils or stains under UV lights. Visible light is a broadband white source, and its color temperature ranges from 5000 K to 8300 K. Wavelengths of UV light can include 365 nm or 395 nm wavelengths. When food soils are illuminated with UV lights, they fluoresce and generate light signals residing in the visible band. The exact wavelengths of such fluorescence signals depend on the food soil types. Since the UV emission is used only for exciting the food soils, the UV reflectance from the food soils are eliminated or heavily suppressed by a long-pass filter whose low cutoff frequency is, for example, 470 nm. In some embodiments, two white light sources complement each other in their food soil detectability. Since a vast majority of articles of dishware are white and specular, any (light) signals reflected off of food soils under visible white lights could often be hardly distinguishable from the signals reflected from the surface of such an article of dishware (also referred to as a "dish"). For such food soils, the UV fluorescence has much higher contrast and significantly lower reflectance, giving highly improved signal detectability or discernibility. On the contrary, some food soils such as dried coffee residue hardly produce fluorescence under UV. However, their colors under a visible white light are very distinct from the dish surface, leading to enhanced discernibility of the food soils in the images.

In one embodiment, cameras and lights can be augmented with different types of filters. The filters on the cameras can be made mechanically switchable between different types to capture the specified wavelengths of signals that are more suitable for the associated light sources. For example, UV fluorescence signals produced by 395 nm UV light mostly reside in spectral bands beyond a certain wavelength (e.g., 490 nm). In such cases a long-pass UV filter that passes the signals in the spectral bands could noticeably improve visibility of any dirt or stains that create those signals, and an associated the signal-to-noise ratios (SNRs). Another type of filter that improves detectability of dirt, soil or stains is a polarization filter. Since articles of dishware can be specular and reflective, dirt signals are often washed out by such reflections due to image saturation. Polarization filters can suppress the reflections on the images if not completely removing them, thereby improving the visibility and distinguishability of the dirt signals from specular reflections from the dish surface.

Another aspect of the stain detection systems described herein is related to presenting objects to the imaging systems (cameras). In some embodiments, a linearly-actuated conveyor moves an article of dishware and places it in a field of view of an imaging system (camera) in a specified position. In particular embodiments, multiple cameras can be placed to create enough views that fully capture images associated with all the surfaces. Also, there can be a mechanism that flips the article of dishware to image the back of the article of dishware. In another embodiment, an article of dishware can be presented to the camera by a robotic actuator. One merit of this design is its ability to present arbitrary surfaces of an article of dishware in arbitrary orientations even with a single camera. Another merit of this configuration is that it can handle various lighting geometries by changing the orientations of the dishware relative to the cameras and lights such that there are no spots that are too dark or too bright when considering all the captured images.

Some embodiments of the stain detection systems described herein use polarization filters to improve the accuracy of human labeling of dirt, soil or stains on an article of dishware. The use of polarization filters has already been described herein as part of improving signal quality by removing reflections. When reflections cannot be completely eliminated, such specular reflections can be confused with bright dirt spots on the image. In such cases, multiple captures acquired with varying polarization filter configurations can be used to improve the accuracy of human labeling during an associated system training process. The varying configurations of the filters create the specular reflections on different parts of the dish image, while the dirt signals stay in the same spots; hence the dirt signals can successfully be separated for more accurate labeling. Another embodiment may use high dynamic range (HDR) cameras to suppress or eliminate the specular reflections.

The UV lights associated with the stain detection systems described herein can also help distinguish dirt, soils or stains on articles of dishware from colorful patterns for data labeling. Under visible lights, patterns on dishes could be confused with the dirt, soils or stains. For example, cheese residues on plates can be confused with yellow dot patterns and can make data labeling less accurate. The UV light usually results in fluorescence only for the actual dirt, soils or stains, but not the patterns on the dish. Using diverse light sources and their associated characteristics significantly extends the applicability of dirt detection to numerous dish types with various textures and patterns.

Figure 2:
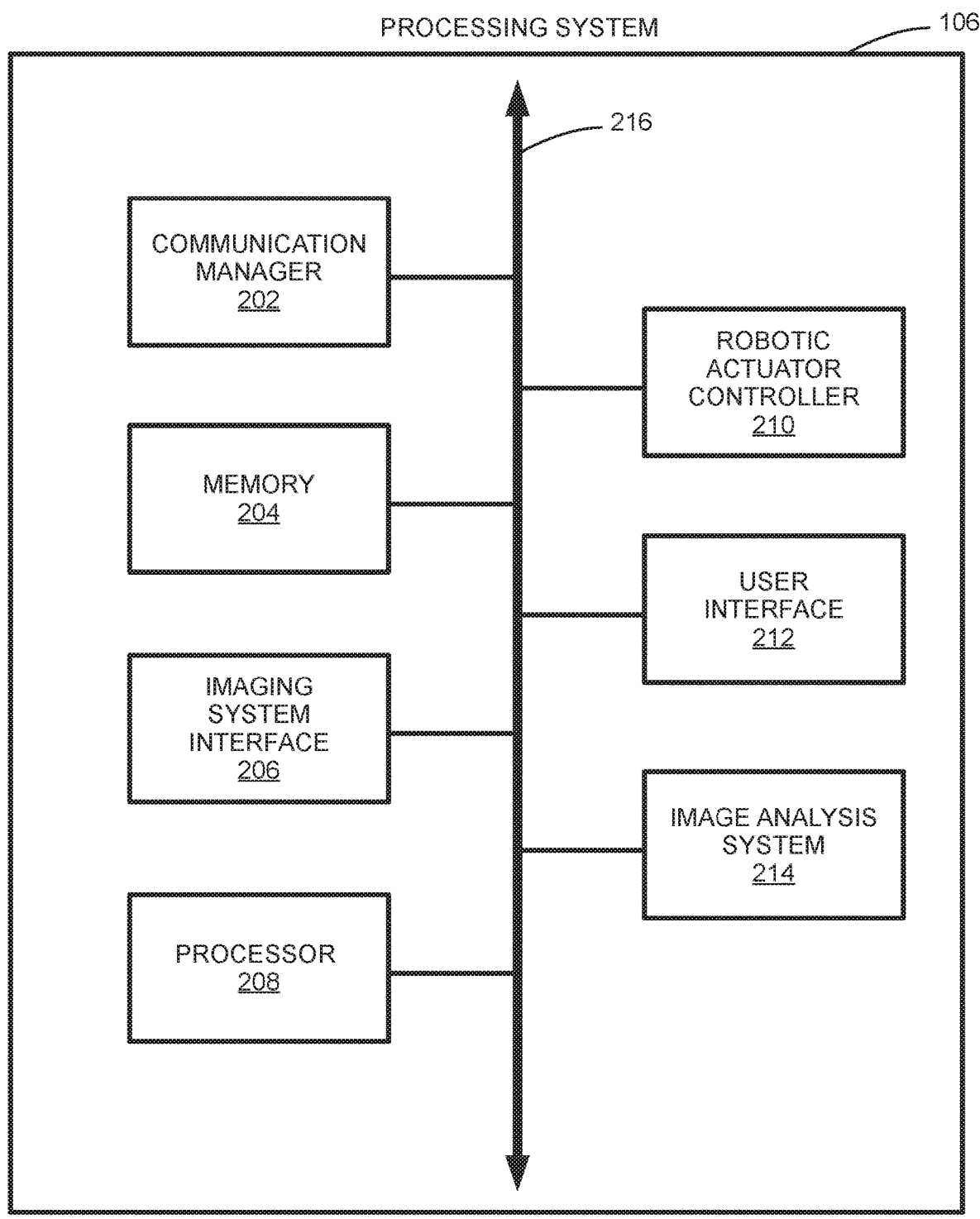
FIG. 2 is a block diagram depicting an embodiment of a processing system capable of operating a stain detection system configured to detect a stain on an article of dishware.

FIG. 2 is a block diagram depicting an embodiment of a processing system 106 capable of operating a stain detection system configured to detect a stain on an article of dishware. In some embodiments, processing system 106 includes a communication manager 202 that is configured to manage communication protocols and associated communication with external peripheral devices as well as communication within other components in processing system 106. For example, communication manager 202 may be responsible for generating and maintaining an interface between processing system 106 and imaging system 104. Communication manager 202 may also manage communication between different components within processing system 106.

In some embodiments, processing system 106 includes a memory 204 that is configured to store data associated with stain detection system 100. Data stored in memory 204 may be temporary data or permanent data. In some embodiments, memory 204 may be implemented using any combination of hard drives, random access memory, read-only memory, flash memory, and so on. In particular embodiments, data stored in memory 204 may include positioning data associated with robotic actuator 116, data from imaging system 104, and so on.

Processing system 106 may also include an imaging system interface 206 that is configured to interface processing system 106 with one or more imaging systems such as imaging system 104. In some embodiments, imaging system interface 206 may include any combination of connectivity protocols such as IEEE 1394 (FireWire), Universal Serial Bus (USB), and so on. Imaging system interface 206 allows processing system 106 to receive images from an associated imaging system, while also sending commands to the imaging system (e.g., a command to capture an image when an article of dishware is in a particular position in a field of view of the imaging system).

Processing system 106 may also include a processor 208 that may be configured to perform functions that may include generalized processing functions, arithmetic functions, and so on. Processor 208 may also be configured to perform three-dimensional geometric calculations and solve navigation equations in order to determine relative positions, trajectories, and other motion-related and position-related parameters associated with manipulating an object by a robotic actuator.

In some embodiments, processing system 106 includes a robotic actuator controller 210 that is configured to output actuation commands to robotic actuator 116. The commands output by robotic actuator controller 210 may include positioning commands, object gripping commands, object release commands, object repositioning commands, and so on.

A user interface 212 may be included in processing system 106. In some embodiments, user interface 212 is configured to receive commands from a user or display information to the user. For example, commands received from a user may be basic on/off commands, and may include variable operational speeds. Information displayed to a user by user interface 212 may include, for example, system health information and diagnostics. User interface 212 may include interfaces to one or more switches or push buttons, and may also include interfaces to touch-sensitive display screens. In some embodiments, user interface 212 may allow a user to annotate an image of an article of dishware as described herein. This annotation may be performed, for example, via a touchscreen, or a combination of a keyboard/mouse interface and a visual display monitor.

In some embodiments, processing system 106 includes an image analysis system 214 that is configured to process images of an article of dishware captured by, for example, imaging system 104 to determine a presence of a stain, soil or dirt on an article of dishware. Image analysis system 214 may include subsystems that implement convolutional neural network (CNN) based algorithms for processing the images, as discussed herein. A data bus 216 interconnects all subsystems associated with processing system 106, transferring data and commands within processing system 106.

Figure 3:
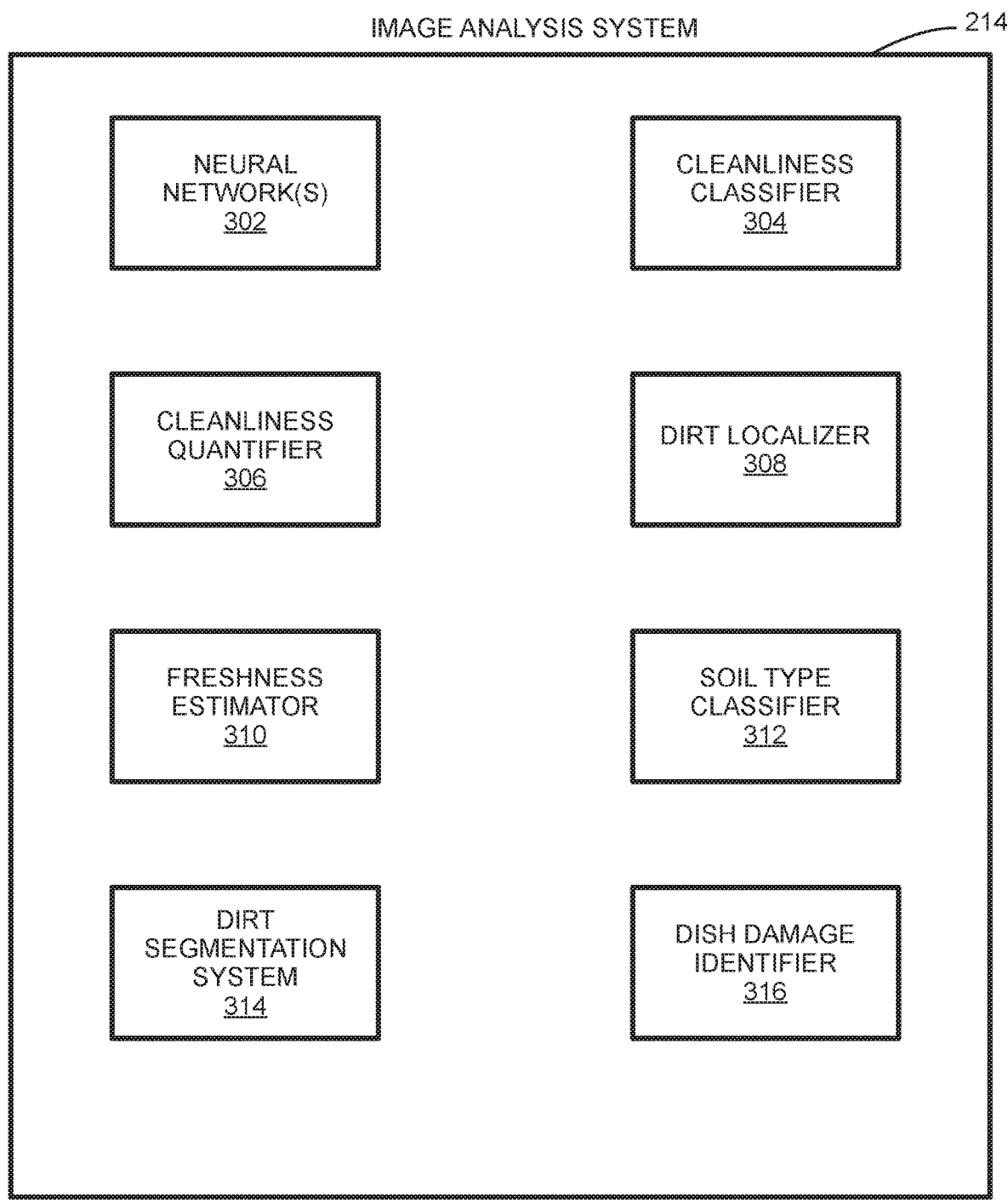
FIG. 3 is a block diagram depicting an embodiment of an image analysis system.

FIG. 3 is a block diagram depicting an embodiment of image analysis system 214. In some embodiments, image analysis system 214 is configured to process one or more images associated with an article of dishware and responsive to the associated image analysis, to determine whether an article of dishware is soiled, stained, dirty or damaged, and determine a location of the soil, stain, dirt or defect on the article of dishware. In some embodiments, image analysis system 214 includes neural networks 302 that are configured to implement deep learning techniques on images received from imaging system 104 to determine a presence of a stain, dirt, or a defect on an article of dishware. In particular embodiments, neural networks 302 are comprised of convolutional neural networks (CNNs). In some embodiments, neural networks 302 may be configured to automatically extract any features and rules buried in a large amount of labeled or annotated data (in this case, labeled or annotated visual data associated with one or more images associated with an article of dishware). This stipulates highly accurate data labeling and annotation for highly accurate computer-vision components, as discussed herein. The details on a choice of specific data labeling and annotation procedures, the CNN architectures, and their associated training procedures are discussed herein.

In some embodiments, image analysis system 214 includes a cleanliness classifier 304 that is configured to classify a level of cleanliness associated with an article of dishware. In particular embodiments, the cleanliness classification is a binary classification that is comprised of a dirty or not dirty classification associated with the article of dishware, where a dirty classification is used to include a detection of a presence by image analysis system 214 of a stain, dirt, a soil, or a defect on the article of dishware. In some embodiments, cleanliness classifier 304 may be configured to classify images of an article of dishware prior to a wash. In other embodiments, cleanliness classifier 304 may be configured to classify images of an article of dishware after a wash to determine whether the article of dishware is still dirty. In still other embodiments, cleanliness classifier 304 may be configured to classify images of an article of dishware before and after washing.

Some embodiments of image analysis system 214 include a cleanliness quantifier 306 that is configured to produce a scale of cleanliness (i.e., a cleanliness quantification) in terms of a number of discrete labels based on images of an article of dishware captured before or after washing. In some embodiments, cleanliness quantifier 306 may be implemented using a CNN, where cleanliness quantification is achieved by first training the CNN by having a human label each image or a set of images based on the different levels of cleanliness during a training process for an associated CNN. For example, an image may be labeled as very dirty, mildly dirty, almost clean, and clean. A large number of labeled images from each class are used to train the CNN. The trained CNN automatically learns about features from the vast amount of data that can be used to tell that a plate is very dirty, mildly dirty, almost clean, and clean. Such features are stored in the form of weights in the CNN. During prediction time (i.e., when the CNN is deployed to implement its functionality), an image or a set of images of an article of dishware are input to the CNN and the CNN outputs a classification label.

In some embodiments, cleanliness classifier 304 or cleanliness quantifier 306 may be implemented using adaptations of a Residual Network (ResNet-50) CNN. In particular embodiments, an associated training algorithm for a ResNet-50 CNN is a stochastic gradient optimization algorithm. An associated learning rate for the stochastic gradient descent is selected by sweeping a range of feasible numbers and by selecting the one that produces the best results.

In some embodiments, image analysis system 214 includes a dirt localizer 308 that is configured to estimate locations of one or more bounding boxes that tightly enclose a corresponding plurality of spots in an image associated with an article of dishware, with a spot being associated with dirt, a soil, a stain, or a defect. This process is referred to as dirt localization. In some embodiments, these bounding boxes may also be referred to as tight bounding boxes. In particular embodiments, dirt localizer 308 may be implemented using a CNN. During a CNN training phase, a user manually annotates any locations of spots (or artifacts in an image corresponding to soil, dirt, stains, defects and so on) using tight bounding boxes, and this human input is used to characterize the spots. A location of a tight bounding box in an image is represented by a set of four numbers: the center x coordinate, the center y coordinate, the width of the tight bounding box, and the height of the tight bounding box. The locations of all tight bounding boxes in an image and a set of all associated images are then fed to a CNN as training data. In some embodiments, a region-based CNN (Faster R-CNN) is then trained to learn any features associated with the spots. A Faster R-CNN may be configured to classify the locations of the tight bounding boxes for dirty spots associated with the input images from a massive amount of training data. The outputs of the Faster R-CNN are the estimated locations of the tight bounding boxes for the dirty spots in an input image on which the prediction is performed. A regression (regressive analysis) is performed to produce an estimated location of the tight bounding boxes for dirty spots. A level of dirtiness of each dirty spot in each tight bounding box can also be classified in a similar manner to that described in the cleanliness quantification process associated with cleanliness quantifier 306. In this case, the training data would be a set of images, for each of which image there are multiple locations of the tight bounding boxes for dirty spots and labels to indicate a level of dirtiness for each bounding box. In the prediction step in the deployed system, the Faster R-CNN then estimates the locations of the bounding boxes for the spots for each input image, and each spot is assigned a label indicating the degree of dirtiness. The training is done by following an alternating 4-step optimization that is associated with a Faster R-CNN to perform the end-to-end training. The alternating 4-step optimization, also referred to a 4-step alternating training process, is composed of 1) training a region proposal network (RPN) that proposes candidates (i.e., proposed regions) for bounding boxes, which is initialized with a pre-trained model and then fine-tuned end-to-end, 2) using the proposed regions and initializing a detection network with the pre-trained model, 3) using any numerical weights trained in 2) to initialize the RPN, fixing shared convolutional layers, and fine-tuning the shared convolutional layers that belong to only the RPN, and 4) fixing the shared convolutional layers shared between the detection network and the RPN and fine tuning the shared convolutional layers that belong to only the detection network. In some embodiments, the detection network is configured to adjust and further tighten any tight bounding boxes proposed by the RPN.

In some embodiments, image analysis system 214 may include a freshness estimator 310 that is configured to determine whether a food stain or soil on an article of dishware is fresh, or determine an approximate age of the food stain. This functionality provided by freshness estimator 310 could be useful particularly in such places as cafeterias in a hospital or schools where people drop off a tray of dishwares they eat off of. In such cases, food soil freshness for a purpose of dishwashing can be timed from the time where the diners drop off the trays. Alternatively, food soil freshness for a particular food soil can be indirectly estimated by measuring a time taken for a dishwashing machine to remove the food soil. For each dirty article of dishware, imagery and associated image processing may be used to determine when the article of dishware is completely cleaned by a dishwashing machine. The time taken for the article of dishware to be completely cleaned can then be used as an approximate measure of freshness of a soil or stain. This time can be measured in, for example, increments of 0.2 s to estimate the degree of freshness of the food soils at a sufficient resolution. Such discrete time steps can be used as labels for the images captured before the articles of dishware are cleaned. These images and the associated labels (i.e., the cleaning times) can then be used as the training data to train a CNN for classification of the time labels. This allows an associated automated dishwashing system to estimate how long it would take to clean a stain that has been successfully characterized. In some embodiments, the CNN architecture used is a modification of ResNet-50, which is trained with a stochastic gradient descent algorithm.

Some embodiments of image analysis system 214 include a soil type classifier 312 that is configured to estimate what type of menus or food ingredients are in the associated with a particular soil, stain or dirt on an article of dishware. This functionality may incorporate prior knowledge of possible food items that may be placed in or on the article of dishware, such as a menu of a restaurant or a business that runs a dishwashing system that includes the stain detection systems discussed herein.

A dirt segmentation system 314 may be included in some embodiments of image analysis system 214. Dirt segmentation system 314 is configured to produce contours that tightly enclose any stains or spots on an article of dishware.

In some embodiments, dirt segmentation system 314 may be implemented using a CNN-based architecture similar to the other CNN architectures discussed herein. Dirt segmentation system 314 may be subject to training and deployment steps as discussed above for other subsystems of image analysis system 214. In some embodiments, a user may designate tight-enclosing contours around a spot, stain or defect during a CNN training phase. Such training methods are performed over a large set of data, after which the CNN-based dirt segmentation system 314 may be deployed with full functionality.

In some embodiments, image analysis system 214 includes a dish damage identifier 316 that is configured to detect or determine a presence of a defect or damage on an article of dishware. Examples of defects or damage include chips, cracks, and scratches. Dish damage identifier 316 estimates the existence of damage, possibly with their associated positions on articles of dishware, using the techniques associated with dirt and stain detection, including a training phase and a deployment phase as discussed earlier.

In some embodiments, functionalities of any combination of cleanliness classifier 304, cleanliness quantifier 306, dirt localizer 308, freshness estimator 310, soil type classifier 312, dirt segmentation system 314, and dish damage identifier 316 may be each be implemented using a CNN-based architecture such as a ResNet-50, Faster R-CNN, and so on. Each CNN is configured to operate in two phases—a training phase and a deployment phase. During a training phase, a CNN is "taught" by, for example, a user who manually annotates and classifies associated regions of interest in a large dataset of images corresponding to articles of dishware. The CNN is then deployed to be functional, where the CNN uses the trained data to intelligently detect and classify a spot, a stain, dirt, or a defect on an article of dishware.

In some embodiments, images acquired after washing an article of dishware by a dishwasher (dishwashing machine) are processed by CNNs to produce a binary classification output on a cleanliness associated with the article of dishware, or a multi-class classification output representing a level of the cleanliness. In some embodiments, a binary classification result may be used to provide quality assurance to users of the dishwashing machine. A data labeling and training procedure similar to the one described above for binary and multi-class classification can also be used for quality assurance associated with a dishwashing process. Images taken after any cleaning steps are completed are labeled by human users as a part of a training phase to indicate whether each article of dishware in an image is completely clean or not; hence a binary designation on the output. The images and the labels are then used to train an adaptation of a ResNet-50 CNN similar to the one described above. For finer granularity for cleanliness, the human users may label the same image in a finer-grained manner: very dirty, mildly dirty, almost clean, and clean. The remaining steps for training the ResNet-50 CNN are similar, except that the output is a multi-class label, and an associated loss function that is minimized by the stochastic gradient descent is a categorical cross-entropy. A trained CNN learns in the form of weights that are used as filters to derive the features that are automatically learned from a massive amount of data. This multi-class classification result may be used to show the cleaning efficacy trend to the users for monitoring the machine performance over time or during a day's operation.

In some embodiments, the images confirmed to be clean can be classified to inspect scratches, chips, defects, and damages on the clean dishes. These results can be used to inform a status of articles of dishware, and to recommend replacing any damaged articles of dishware. For defect detection, each image is labeled or annotated by a human user either in the form of binary classification or multi-class classification during a CNN training phase. For binary classification, humans label each image to indicate whether the dishware in the image has any defects or damage. For defect or damage detection, humans annotate the locations of defects and damage in the form of bounding boxes tightly enclosing the each of the defects and damage locations. Also, each bounding box can be labeled to indicate the type of damages such as chips, cracks, etc. For training a CNN for classification, a ResNet-50 can be adapted in a manner similar to the procedure described above. For defect detection, as in dirt localization, a Faster R-CNN can be modified to perform the defect detection task.

In some embodiments, dirt segmentation can be performed in a manner similar to dirt localization. Dirt localization takes the tight bounding boxes discussed earlier, enclosing a soil as inputs to the CNN for conducting the dirt localization tasks. In some embodiments, a user may use a contour or polygon to manually tightly enclose a food soil or stain. The dirt segmentation takes such polygons tightly enclosing food soils as inputs along with the associated images. The polygons are aligned with the boundaries of the food soils. Such polygons are annotated by humans for creating the labeled data. In an implementation, a polygon may be equivalently represented as a set of pixels that are enclosed by the polygon. The inputs, the images and the polygon annotations are used to train an adaptation of a Mask R-CNN. During the prediction (deployment) phase, an image is passed through the adaptation of a Mask R-CNN to produce a set of pixels that are predicted as food soils.

Any images of an article of dishware acquired before washing are annotated, where a human user manually draws bounding boxes or contours around any dirt, stains, soils or defects. An object detection method based on CNNs processes these images to estimate the respective locations of the dirt, stains, soils or defects in the form of bounding boxes. These bounding boxes can be used to configure an automated dishwashing machine. Based on the results, the dishwashing machine is configured such that a water nozzle or spray associated with the dishwasher for washing the article of dishware can be focused more heavily on those dirt areas for more effectively cleaning of those areas, as discussed herein. This mechanism may be augmented by adding a feedback loop based on the cleanliness classification of those dirt spots while the article of dishware is washed. A pressure of the water or cleaning solution may also be adjusted by the feedback that can indicate the amount of dirt, stains, or soils left. The amount of dirt, stains or soils can be estimated by cleanliness quantifier 306, or dirt segmentation system 314 can be used to estimate a surface area associated with the dirt, stains or soils.

Figure 4:
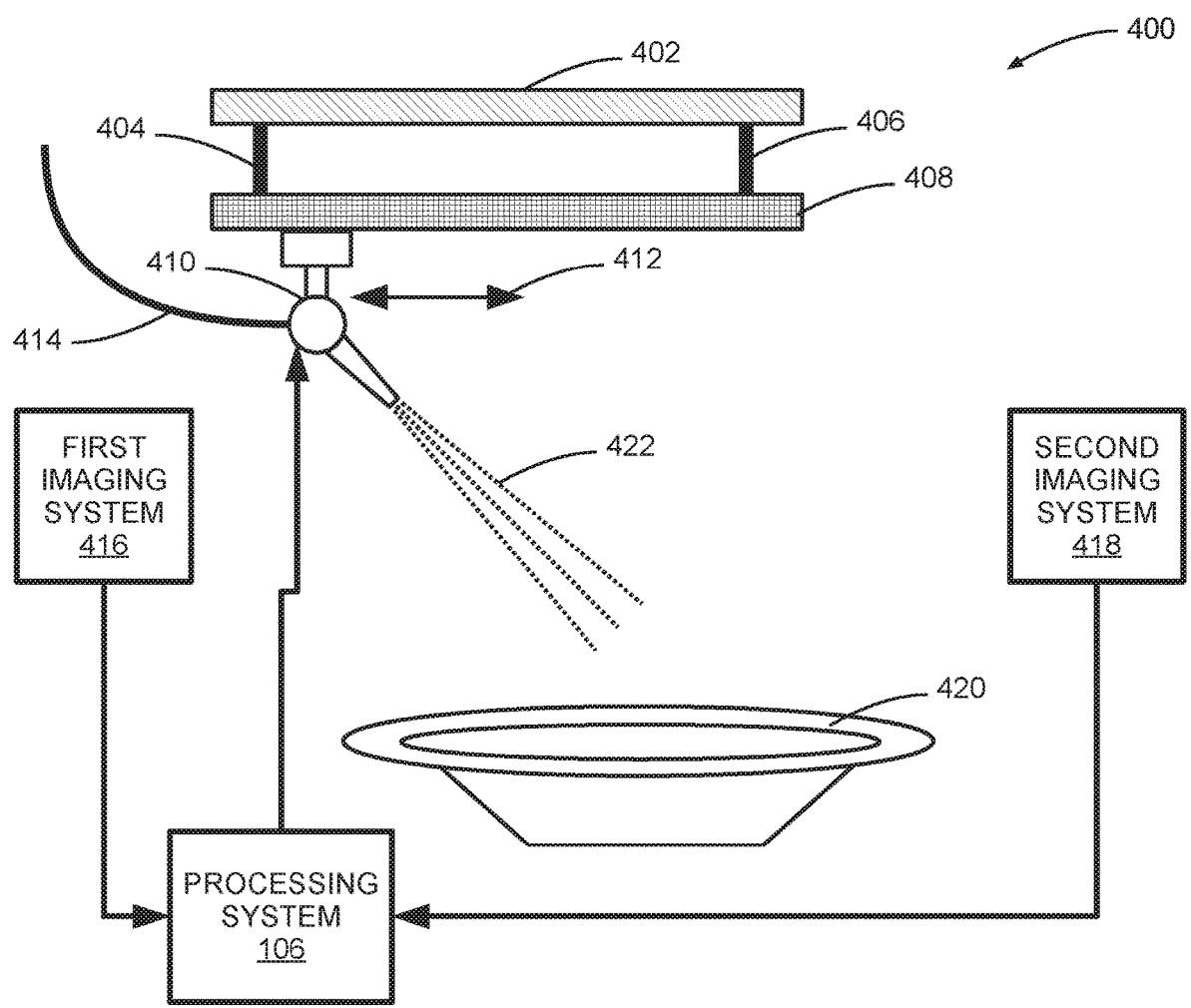
FIG. 4 is a schematic diagram depicting an embodiment of a targeted cleaning system.

FIG. 4 is a schematic diagram depicting an embodiment of a targeted cleaning system 400. In some embodiments, targeted cleaning system 400 is configured to combine the stain detection systems and methods described above with a dishwashing effort associated with an article of dishware in real time. In some embodiments, targeted cleaning system 400 includes a first imaging system 416 and a second imaging system 418, each of which are configured to capture one or more images of an article of dishware 420. In some embodiments, first imaging system 416 and second imaging system 418 are configured to capture images of different portions of article of dishware 420. The one or more images captured by each of imaging system 416 and imaging system 418 are received by processing system 106 that is configured to detect a presence and location of a stain, soil, or dirt on article of dishware 420, using the methods described herein (e.g., a CNN-based dirt detection method). Processing system 106 is also configured to issue commands to a steerable nozzle 410 that is configured to spray a fluid 422 (e.g., dishwashing solution) at a specified temperature, pressure and concentration, onto article of dishware 420. In some embodiments, if water pressure of a typical house is used, the pressure of fluid 422 may be varied between 10 and 100 psi. In other embodiments, if a high pressure pump is used for the dishwashing process, the pressure of fluid 422 may be adjusted from 50 to 2500 psi. In some embodiments, the temperature of fluid 422 may be varied between 100 F. and 180 F..

In some embodiments, steerable nozzle 410 receives fluid 422 via a fluid feed 414 from a fluid source (not shown in FIG. 4). By spraying fluid 422 onto article of dishware 420, steerable nozzle 410 performs a function of dishwashing, where article of dishware 420 is washed and cleaned by fluid 422 sprayed by steerable nozzle 420.

In some embodiments, steerable nozzle 410 is mounted on a gantry 408. In some embodiments, gantry 408 may be an X-Y gantry. In particular embodiments, gantry 408 is attached to a rigid support 402 via a first mounting 404 and a second mounting 406. Examples of rigid support 402 include a workspace, a platform, or any other rigid support that is securely attached to a wall, ceiling or floor of an operating environment associated with targeted cleaning system 400. In some embodiments, steerable nozzle 410 is mounted on gantry 408 such that article of dishware 410 is conveyed under gantry 408 and steerable nozzle 410 by, for example, a conveyor belt (not shown in FIG. 4). In other embodiments, steerable nozzle 410 may be implemented by mounting a fixed nozzle on a multi degree of freedom robot end effector. In still other embodiments, steerable nozzle 410 may be fixed while targeting a stain is accomplished by movement of the article of dishware gripped by a robotic actuator and moved in front of steerable nozzle 410. In general, steerable nozzle 410 is configured to move relative to article of dishware 420, either by configuring steerable nozzle 410 to be a moveable nozzle, or configuring a robotic actuator to move article of dishware 420 relative to steerable nozzle 410, or both.

Responsive to commands from processing system 106, steerable nozzle 410 is configured to move along gantry 408 in directions parallel to a length and a width of article of dishware 420; gantry 408 provides a channel along which steerable nozzle 410 may be moved in these directions. For example, FIG. 4 shows a direction of motion 412 of steerable nozzle 410 that is parallel to a length of article of dishware 420. In some embodiments, steerable nozzle 410 is configured to pivot about at least one axis associated with steerable nozzle 410. This pivoting feature allows steerable nozzle 410 to spray fluid 422 onto article of dishware 420 at different angles. A motion of steerable nozzle 410 along gantry 408 or about the at least one axis may be achieved by mechanically configuring steerable nozzle 410 to be driven by, for example, electric motors such as stepper motors or servomechanisms.

In some embodiments, targeted cleaning system 400 may also include one or more light sources (not shown in FIG. 4) that are configured to illuminate article of dishware 420 to assist first imaging system 416 and second imaging system 418 in capturing the at least one image of article of dishware 420. These light sources may be any combination of white light sources, UV light sources, or any other light source as described herein.

In some embodiments, first imaging system 416 and second imaging system 418 may capture at least one image of article of dishware 420 prior to article of dishware 420 being washed by steerable nozzle 410. Processing system 106 processes the at least one image received from first imaging system 416 and second imaging system 418 to determine a presence and location of a stain, dirt, or soil on article of dishware 420 using different components of image analysis system 214 such as cleanliness classifier 304, cleanliness quantifier 306, and dirt localizer 308. Responsive to determining a presence and location of a stain, dirt, or soil on article of dishware 420, processing system 106 commands steerable nozzle 410 to move along gantry 408 and pivot about the at least one axis so that a cleaning (dishwashing) action of steerable nozzle 410 is focused on the location of the stain, dirt, or soil. For example, steerable nozzle 410 may initially spray the whole surface of article of dishware 410 to achieve a general cleaning action. This spraying action may be at a predetermined, baseline temperature, pressure and concentration associated with fluid 422. Next, steerable nozzle 410 may be commanded by processing system to focus spraying fluid 422 to a local region on article of dishware 420 that is associated with the location of the stain, dirt or soil. A temperature and pressure of fluid 422 may be increased relative to the baseline temperature and pressure, while a concentration of a cleaning agent (e.g., dishwashing soap) in fluid 422 may be increased relative to the baseline concentration. This technique, also referred to as targeted cleaning, is an intelligent dishwashing technique, where concentrated cleaning efforts are focused (or targeted) only in localized regions on article of dishware 420 where stains, dirt, or soils are detected using the systems and methods described herein. In some embodiments, outputs from soil type classifier 312 may be used to characterize a nature of a soil on article of dishware 420. For example, a soil associated with fresh coffee stains may require less cleaning effort than baked-on cheese. This targeted cleaning approach allows for an increase in a throughput associated with the dishwashing process, and a reduction in resources needed to clean the article of dishware relative to, for example, a generalized cleaning system that sprays the entire article of dishware using a high temperature, high pressure, high concentration dishwashing solution.

In some embodiments, if processing system 106 detects and localizes multiple regions of stains, dirt, or soils on article of dishware 420, the targeted cleaning method using steerable nozzle 410 can be applied sequentially to each region. First imaging system 416 and second imaging system 418 may be configured to capture images of article of dishware 420 at different times (e.g., periodically) during the cleaning (i.e., dishwashing) process, between subsequent cleaning phases. Each set of such images may be analyzed by image analysis system 214 associated with processing system 106 to determine whether the stains, dirt, or soils detected prior to beginning the cleaning process have been cleaned, and whether article of dishware 420 is clean. If article of dishware 420 is still dirty, processing system continues to command steerable nozzle 410 to perform targeted cleaning on the regions on article of dishware 420 that are still dirty. Once article of dishware 420 is determined to be clean, article of dishware 420 is conveyed away from steerable nozzle 410 to make way for the next article of dishware to be processed.

Figure 5A:
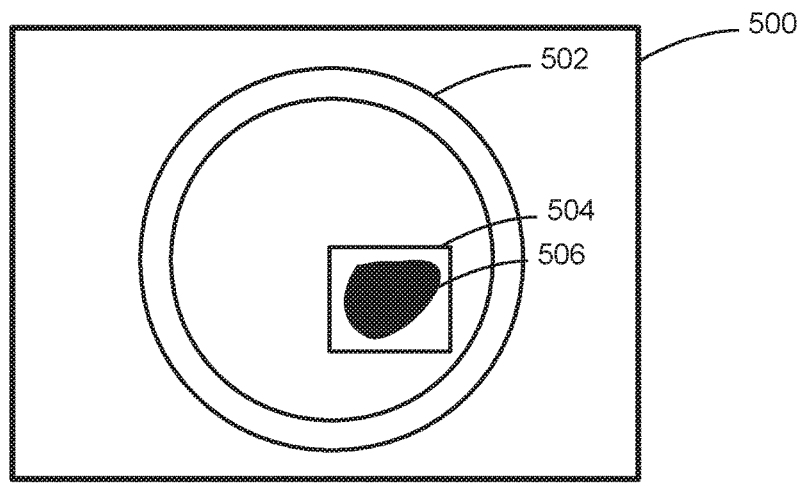
FIGS. 5A-5E are schematic diagrams depicting examples of data labeling and annotation associated with operation of an embodiment of a stain detection system.

FIG. 5A is a schematic diagram depicting an example of data labeling and annotation associated with operation of an embodiment of a stain detection system. FIG. 5A depicts an image 500 of an article of dishware 502. Image 500 may be captured by, for example, imaging system 104. FIG. 5A depicts a stain 506 on article of dishware 502, along with a tight bounding box 504 as described above. Tight bounding box 504 may be user-defined during a training phase associated with a CNN, or generated by the CNN during a deployment phase. Tight bounding box 504 essentially delineates a stain, dirt, or soil on article of dishware 502 for a purpose of classification.

Figure 5B:
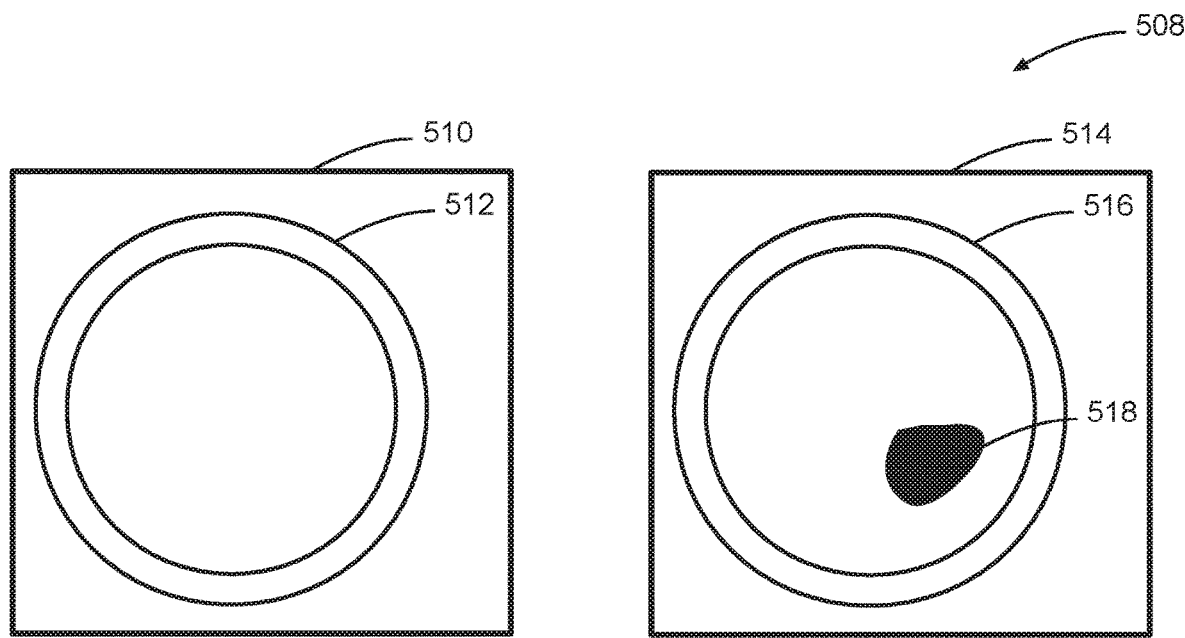

FIG. 5B is a schematic diagram 508 depicting an example of data labeling and annotation associated with operation of an embodiment of a stain detection system. Specifically, FIG. 5B depicts an example of a binary classification as would be generated by cleanliness classifier 304. FIG. 5B shows an image 510 of a clean article of dishware 512, and an image 514 of a dirty article of dishware 516 with a stain 518. Image 510 and image 514 may be captured separately by, for example, imaging system 102. Cleanliness classifier 304 is configured to individually process each of image 510 and image 514 and generate a binary classification associated with each of image 510 and image 514.

In some embodiments, a training mode of a CNN associated with cleanliness classifier 304, a user would label clean article of dishware 512 as clean, and dirty article of dishware 516 as dirty. During a deployment phase, clean article of dishware 512 would be classified as clean by the CNN associated with cleanliness classifier 304; the same CNN would classify dirty article of dishware 516 as dirty, consistent with a binary dirty/not dirty paradigm.

Figure 5C:
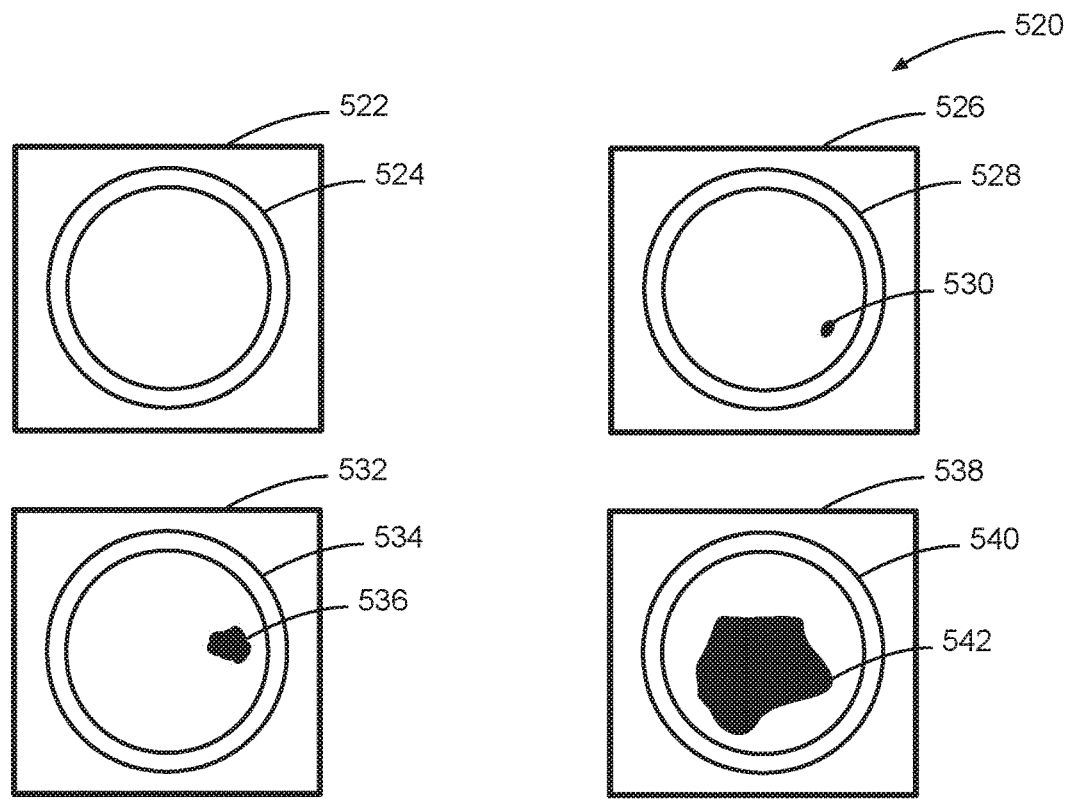

FIG. 5C is a schematic diagram 520 depicting an example of data labeling and annotation associated with operation of an embodiment of a stain detection system. Specifically, FIG. 5C depicts an example of a multi-class classification as would be generated by cleanliness quantifier 306. FIG. 5C shows a first image 522 of a clean article of dishware 524, a second image 526 of an article of dishware 528 with a first stain 530, a third image 532 of an article of dishware 534 with a second stain 536, and a fourth image 538 of an article of dishware 540 with a third stain 542. (The term "stain" is used to denote a stain, dirt, or a soil.) For multi-class classification (i.e., cleanliness quantification), article of dishware 524 would be classified as clean, article of dishware 528 would be classified as almost clean, article of dishware 534 would be classified as moderately dirty, and article of dishware 540 would be classified as very dirty. These classifications are consistent with the size of each stain—article of dishware 524 has no stain; first stain 530 is smaller than second stain 536, which is smaller than third stain 542.

In some embodiments, the above multi-class classification is performed by a human user during a CNN training phase, where a large number of images are classified and used to build the CNN's intelligence base. In some embodiments, the number of images used may range from a few thousand to hundreds of thousands to millions. During a deployment phase, the CNN utilizes this intelligence base to multi-class classify an article of dishware based on one or more images received by an associated imaging system.

Figure 5D:
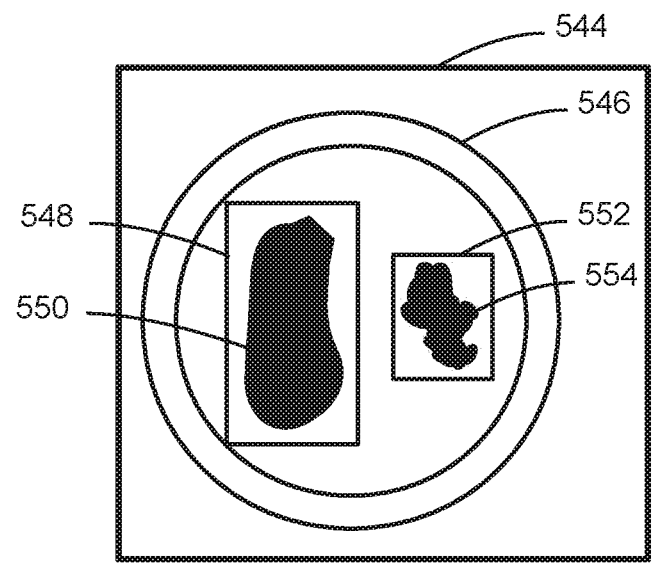

FIG. 5D is a schematic diagram depicting an example of data labeling and annotation associated with operation of an embodiment of a stain detection system. Specifically, FIG. 5D depicts an example of dirt localization as performed by dirt localizer 308. FIG. 5D shows an image 544 of an article of dishware 546 with a first stain 550 and a second stain 554.

First stain 550 is shown to be enclosed by a tight bounding box 548, while second stain is shown to be enclosed by a tight bounding box 552. Tight bounding box 548 and tight bounding box 552 serve to localize (i.e., provide a location of) each of first stain 550 and second stain 554 on article of dishware 546.

In some embodiments, tight bounding box 548 and tight bounding box 552 may be generated by a human user during a CNN training phase, or automatically by the CNN during a deployment phase. Tight bounding box 548 and tight bounding box 552 serve to provide specific locations of the associated stains to a targeted cleaning system such as targeted cleaning system 400 so that focused (i.e., targeted) cleaning may be performed at the location of the associated stains as discussed above.

Figure 5E:
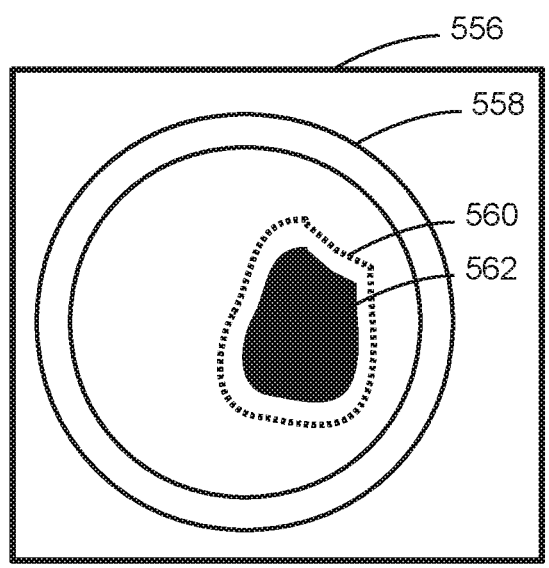

FIG. 5E is a schematic diagram depicting an example of data labeling and annotation associated with operation of an embodiment of a stain detection system. Specifically, FIG. 5E depicts a dirt segmentation output that may be generated by dirt segmentation system 314. FIG. 5E shows an image 556 of an article of dishware 558 with a stain 562. A polygon 560 (also referred to as a contour) is drawn around stain 562 to tightly enclose stain 562.

In some embodiments, polygon 560 may be drawn manually by a human user during a training phase of a CNN associated with dirt segmentation system 314. Polygon 560 may also be drawn automatically by the CNN during a deployment phase.

Figure 6:
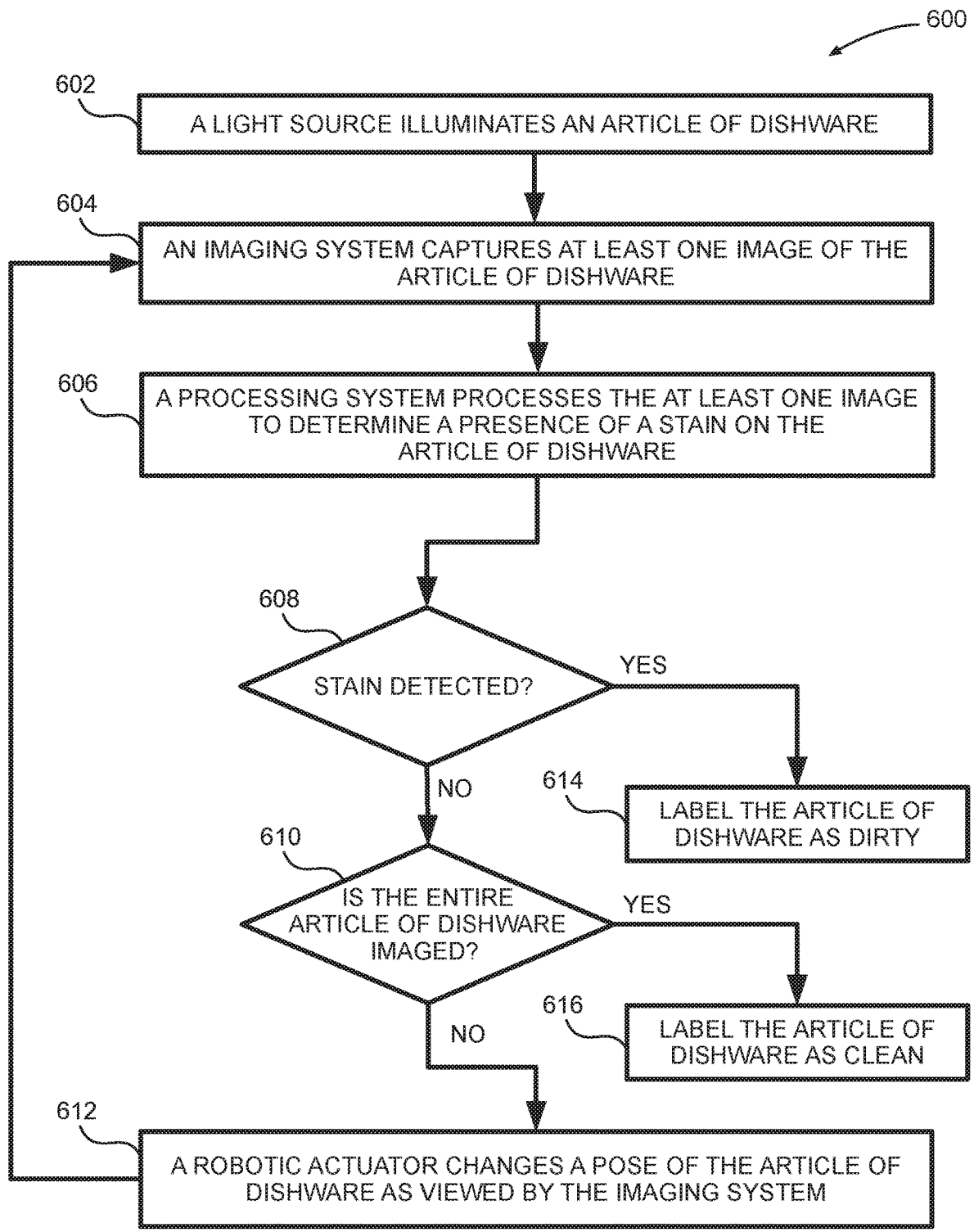
FIG. 6 is a flow diagram depicting an embodiment of a method to determine whether an article of dishware is dirty.

FIG. 6 is a flow diagram depicting an embodiment of a method 600 to determine whether an article of dishware is dirty. At 602, a light source such as light source 102 illuminates an article of dishware such as article of dishware 110. At 604, an imaging system such as imaging system 104 captures at least one image of the article of dishware. Next, at 606, a processing system such as processing system 106 processes the at least one image to determine a presence of a stain on the article of dishware. In some embodiments, processing system 106 performs processing using the CNN-based systems and methods described herein. At 608, the method checks to see if a stain (i.e., a stain, dirt or a soil) is detected on the article of dishware. If a stain is detected, the method goes to 614, where the article of dishware is labeled as dirty. If, at 608, a stain is not detected, then the method goes to 610, where the method checks to see if the entire article of dishware is imaged.

In some embodiments, checking whether the entire article of dishware is imaged may be done, for example, by a priori storing dimensions of the article of dishware as captured in an image, or storing dimensions of different portions of the article of dishware as captured in multiple images by the imaging system. These images serve as reference images for an article of dishware; different articles of dishware with different dimensions may be imaged in this way to be associated with unique reference image sets. By comparing the image or images corresponding at runtime to these reference images, an article of dishware, whether imaged in its entirety or in portions, can be analyzed to determine whether the entire article of dishware has been imaged.

In other embodiments, an open-loop method can be implemented where, if an article of dishware is recognized in advance and the article of dishware is presented to the imaging system in a fixed way by a robotic actuator, then spatial positions of the robotic actuator corresponding to different portions of the article of dishware as presented to the imaging system can be preloaded into the processing system in the form of a data stack. The robotic actuator is then moved through each spatial position and a corresponding image is captured by the imaging system for each spatial position. This allows the processing system to keep track of whether the entire article of dishware has been imaged.

At 610, if the method determines that the entire article of dishware is imaged, then the method goes to 616, where the article of dishware is labeled as clean. At 610, if the method determines that the entire article of dishware is not imaged then the method goes to 612, where a robotic actuator such as robotic actuator 116 changes a pose of the article of dishware as viewed by the imaging system. Changing a pose of the article of dishware as viewed by the imaging system by robotic actuator 116 is consistent with imaging different portions of the article of dishware as described in the discussion of step 610. The method then returns to 604, where the process continues till the article of dishware is labeled either as clean or dirty.

Figure 7:
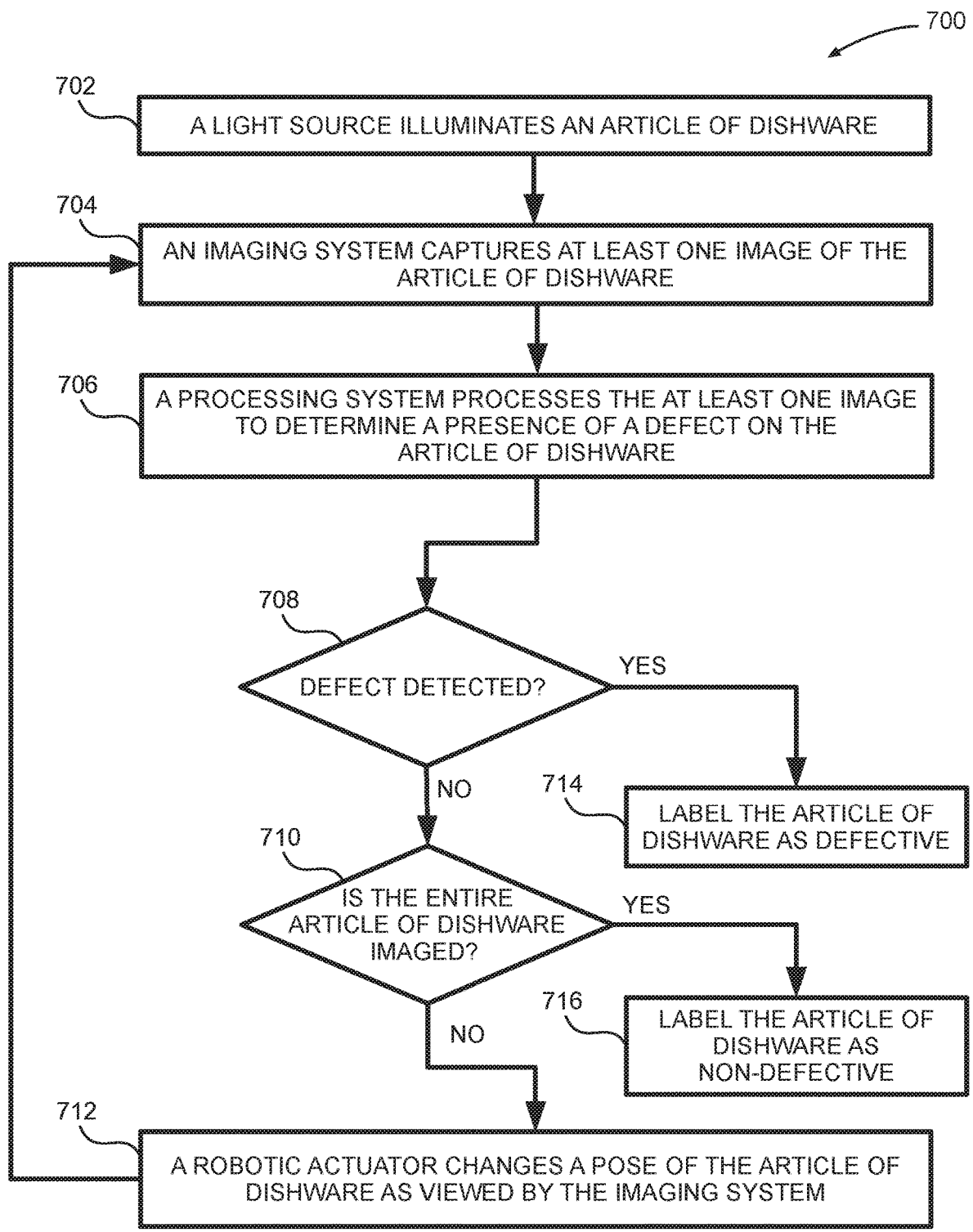
FIG. 7 is a flow diagram depicting an embodiment of a method to determine whether an article of dishware is defective.

FIG. 7 is a flow diagram depicting an embodiment of a method 700 to determine whether an article of dishware is defective. At 702, a light source such as light source 102 illuminates an article of dishware such as article of dishware 110. At 704, an imaging system such as imaging system 104 captures at least one image of the article of dishware. Next, at 706, a processing system such as processing system 106 processes the at least one image to determine a presence of a defect on the article of dishware, where a defect may include a scratch, a chip or some other damage. In some embodiments, processing system 106 performs processing using the CNN-based systems and methods described herein. At 708, the method checks to see if a defect is detected on the article of dishware. If a defect is detected, the method goes to 714, where the article of dishware is labeled as defective. If, at 708, a defect is not detected, then the method goes to 710, where the method checks to see if the entire article of dishware is imaged using the techniques described above.

At 710, if the method determines that the entire article of dishware is imaged, then the method goes to 716, where the article of dishware is labeled as non-defective. At 710, if the method determines that the entire article of dishware is not imaged then the method goes to 712, where a robotic actuator such as robotic actuator 116 changes a pose of the article of dishware as viewed by the imaging system. Changing a pose of the article of dishware as viewed by the imaging system by robotic actuator 116 is consistent with imaging different portions of the article of dishware as described in the discussion of step 610. The method then returns to 704, where the process continues till the article of dishware is labeled either as defective or non-defective.

Figure 8:
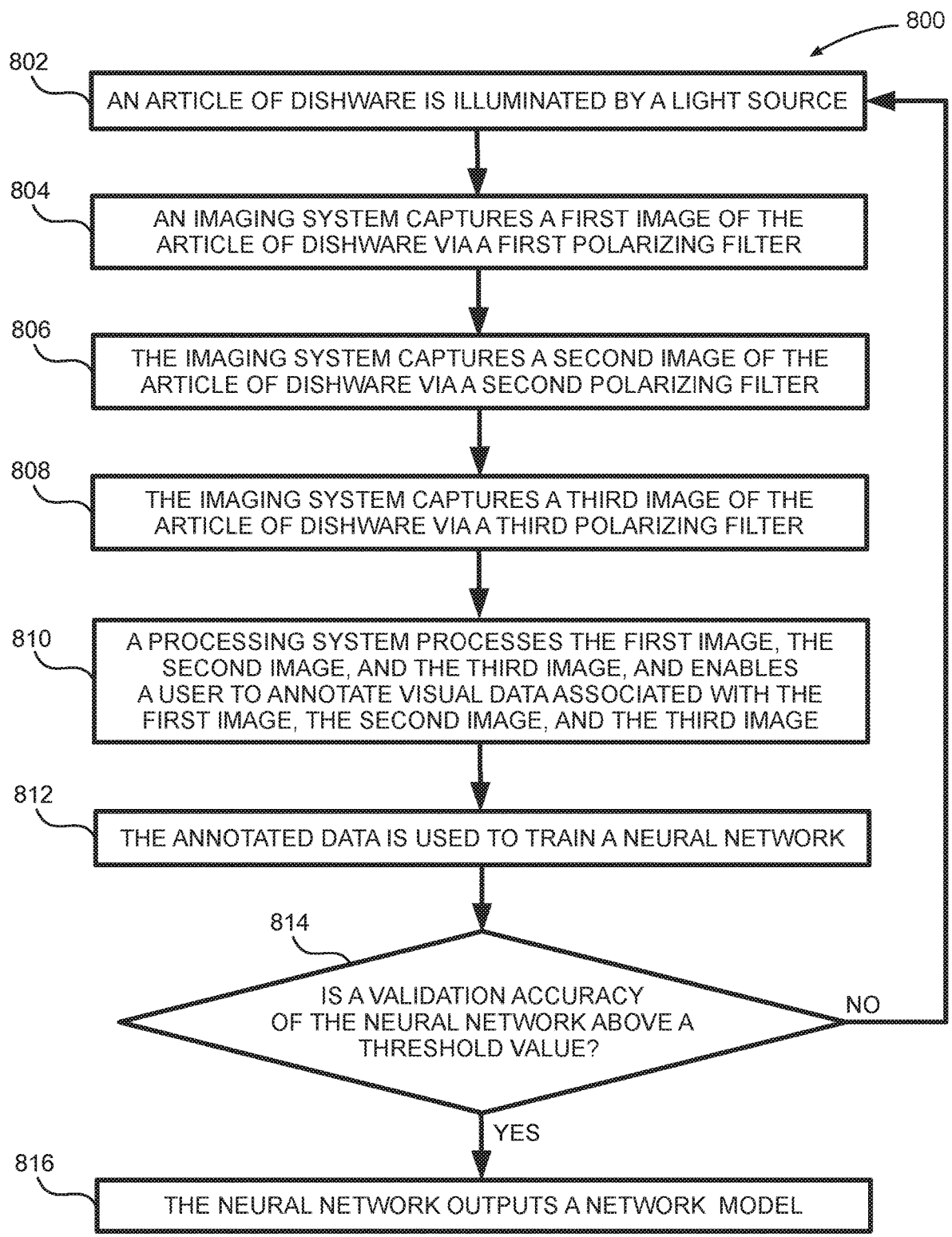
FIG. 8 is a flow diagram depicting an embodiment of a method to train a neural network to perform a function of stain detection.

FIG. 8 is a flow diagram depicting an embodiment of a method 800 to train a neural network to perform a function of stain detection. At 802, an article of dishware such as article of dishware 110 is illuminated by a light source such as light source 102. At 804, an imaging system such as imaging system 104 captures a first image of the article of dishware using a first polarizing filter. At 806, the imaging system captures a second image of the article of dishware using a second polarizing filter. At 808, the imaging system captures a third image of the article of dishware using a third polarizing filter. As discussed herein, using multiple polarizing filters (or polarization filters in different configurations) allows the system to prevent specular reflections off of the article of dishware from adversely affecting the results. If necessary, additional polarization filters or additional polarization filter configurations may be used to capture additional images of the article of dishware.

At 810, a processing system such as processing system 106 processes the first image, the second image and the third image using the systems and methods described herein, and enables a user to annotate visual data associated with the first image, the second image and the third image. In some embodiments, this annotation may include a user drawing tight bounding boxes around dirt, stains, soils or defects, or delineating regions on the article of dishware using contours or polygons as described herein. In some embodiments, a user may interact with processing system via user interface 212. At 812, the annotated data is used to train a neural network such as one or more of the CNNs described herein. Next, at 814, the method checks to determine whether a validation accuracy of the neural network is above a threshold value. In some embodiments, the threshold value is defined to be approximately 85% accuracy, corresponding approximately to an accuracy associated with human performance (i.e., an accuracy that would be achieved if a human performed a stain detection function). The neural network may also be configured to operate at higher accuracy levels (e.g., 90%). Step 814 aims to determine whether the neural network is sufficiently trained to produce reliable and accurate results. If the validation accuracy of the neural network is above the threshold value, then the method goes to 816, where the neural network outputs a network model that is used for runtime deployment. If, at 814, the validation accuracy of the neural network is not above the threshold value, then the method returns to 802, and the process repeats till the validation accuracy of the neural network is above the threshold value.

Figure 9:
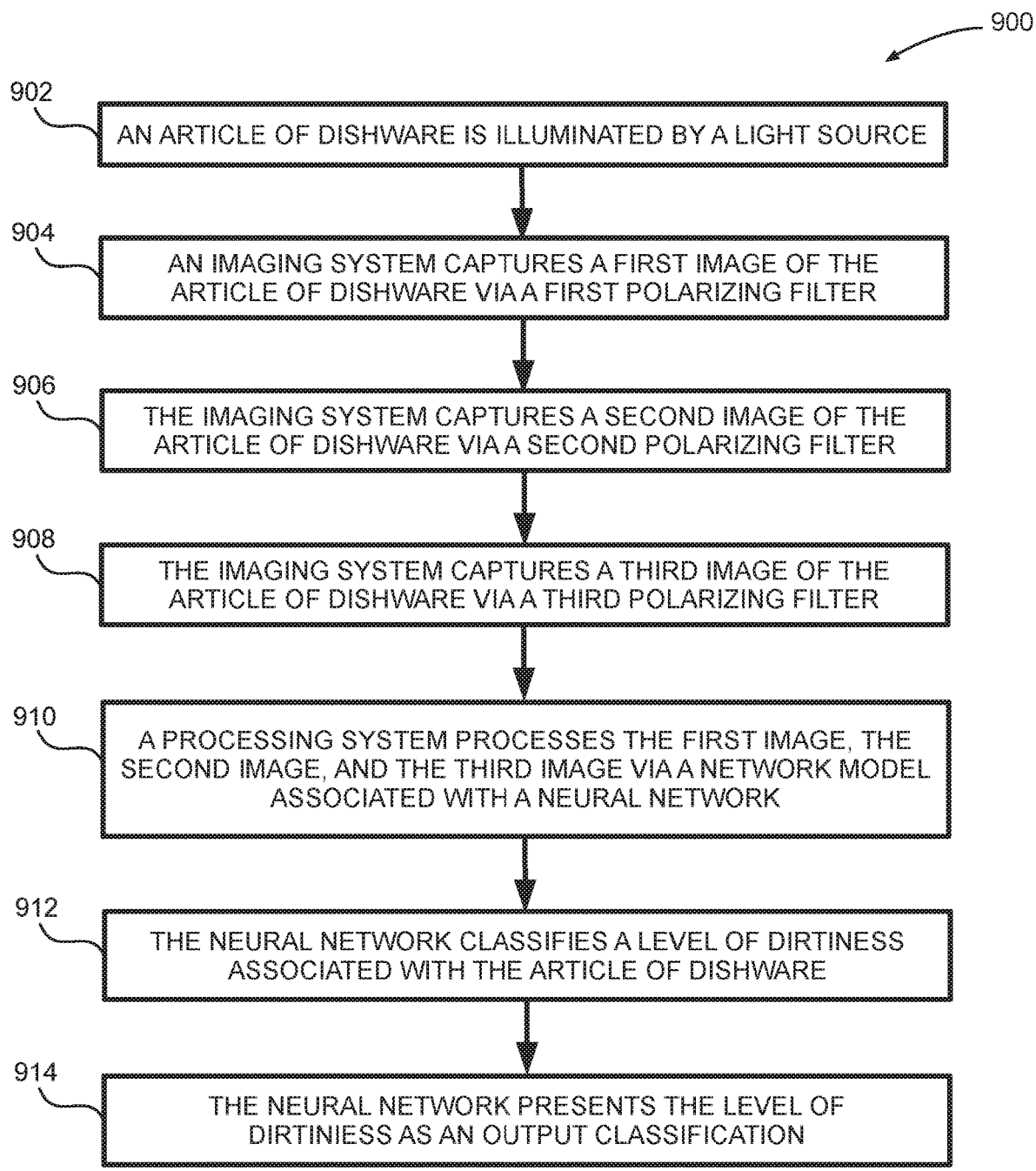
FIG. 9 is a flow diagram depicting an embodiment of a method that uses a trained neural network to perform a function of stain detection and present a level of dirtiness as an output classification.

FIG. 9 is a flow diagram depicting an embodiment of a method 900 that uses a trained neural network to perform a function of stain detection and present a level of dirtiness as an output classification. At 902, an article of dishware such as article of dishware 110 is illuminated by a light source such as light source 102. At 904, an imaging system such as imaging system 104 captures a first image of the article of dishware using a first polarizing filter. At 906, the imaging system captures a second image of the article of dishware using a second polarizing filter. At 908, the imaging system captures a third image of the article of dishware using a third polarizing filter. At 910, a processing system such as processing system 106 processes the first image, the second image and the third image via a network model associated with a neural network such as a CNN. At 912, the neural network classifies a level of dirtiness associated with the article of dishware. Finally, at 914, the neural network presents the level of dirtiness as an output classification. In some embodiments, steps 912 and 914 may be performed by a combination of cleanliness classifier 304 and cleanliness quantifier 306, each of which may use a neural network to implement the relevant processing functions.

Figure 10:
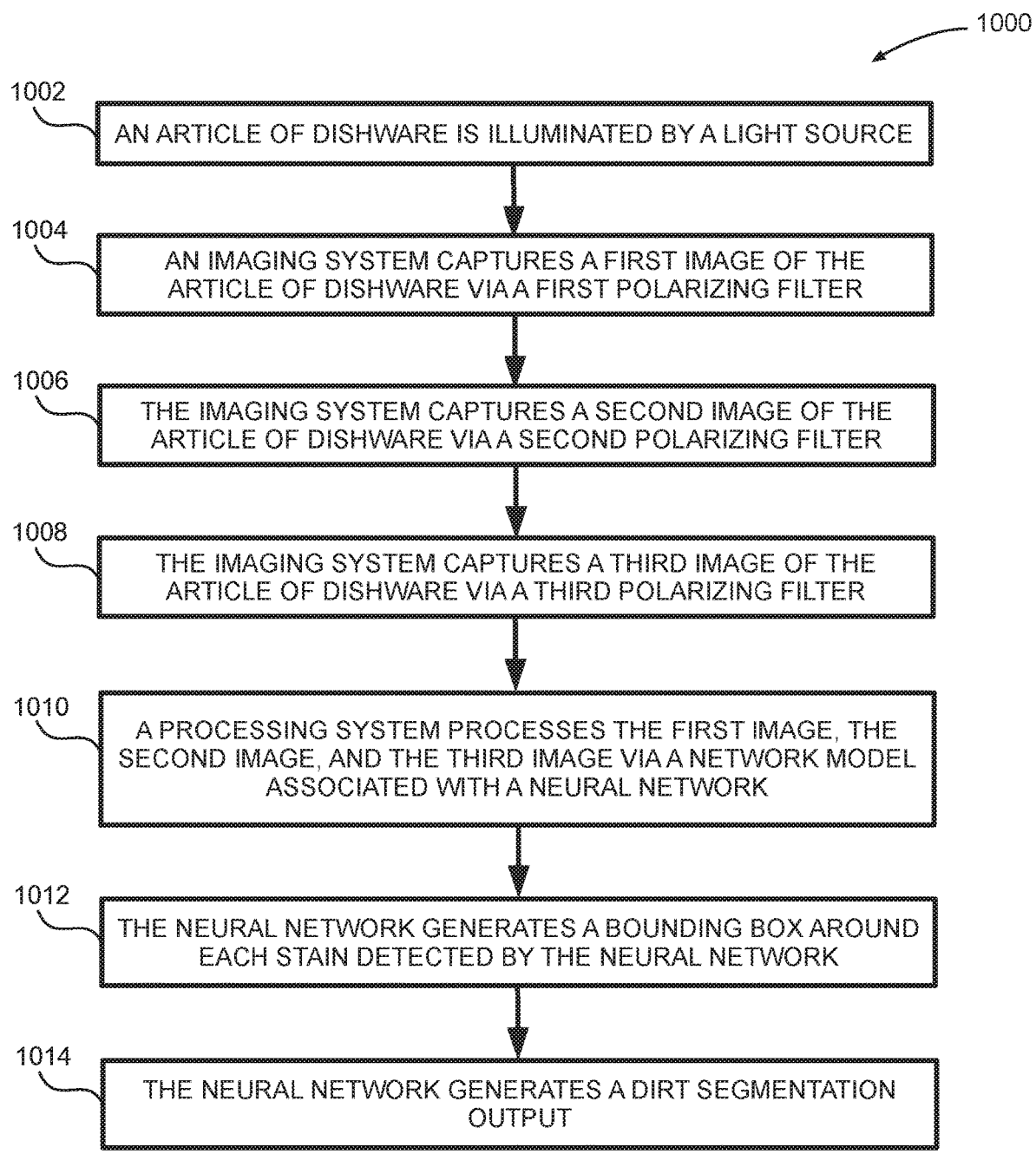
FIG. 10 is a flow diagram depicting an embodiment of a method that uses a trained neural network to perform a function of stain detection and generate a dirt segmentation output.

FIG. 10 is a flow diagram depicting an embodiment of a method 1000 that uses a trained neural network to perform a function of stain detection and generate a dirt segmentation output. At 1002, an article of dishware such as article of dishware 110 is illuminated by a light source such as light source 102. At 1004, an imaging system such as imaging system 104 captures a first image of the article of dishware using a first polarizing filter. At 1006, the imaging system captures a second image of the article of dishware using a second polarizing filter. At 1008, the imaging system captures a third image of the article of dishware using a third polarizing filter. At 1010, a processing system such as processing system 106 processes the first image, the second image and the third image via a network model associated with a neural network such as a CNN. At 1012, the neural network generates a bounding box around each stain detected by the neural network. Finally, at 1014, the neural network generates a dirt segmentation output. In some embodiments, steps 1012 and 1014 may be performed by a combination of dirt localizer 308 and dirt segmentation system 314, each of which may use a neural network to implement the relevant processing functions.

Figure 11:
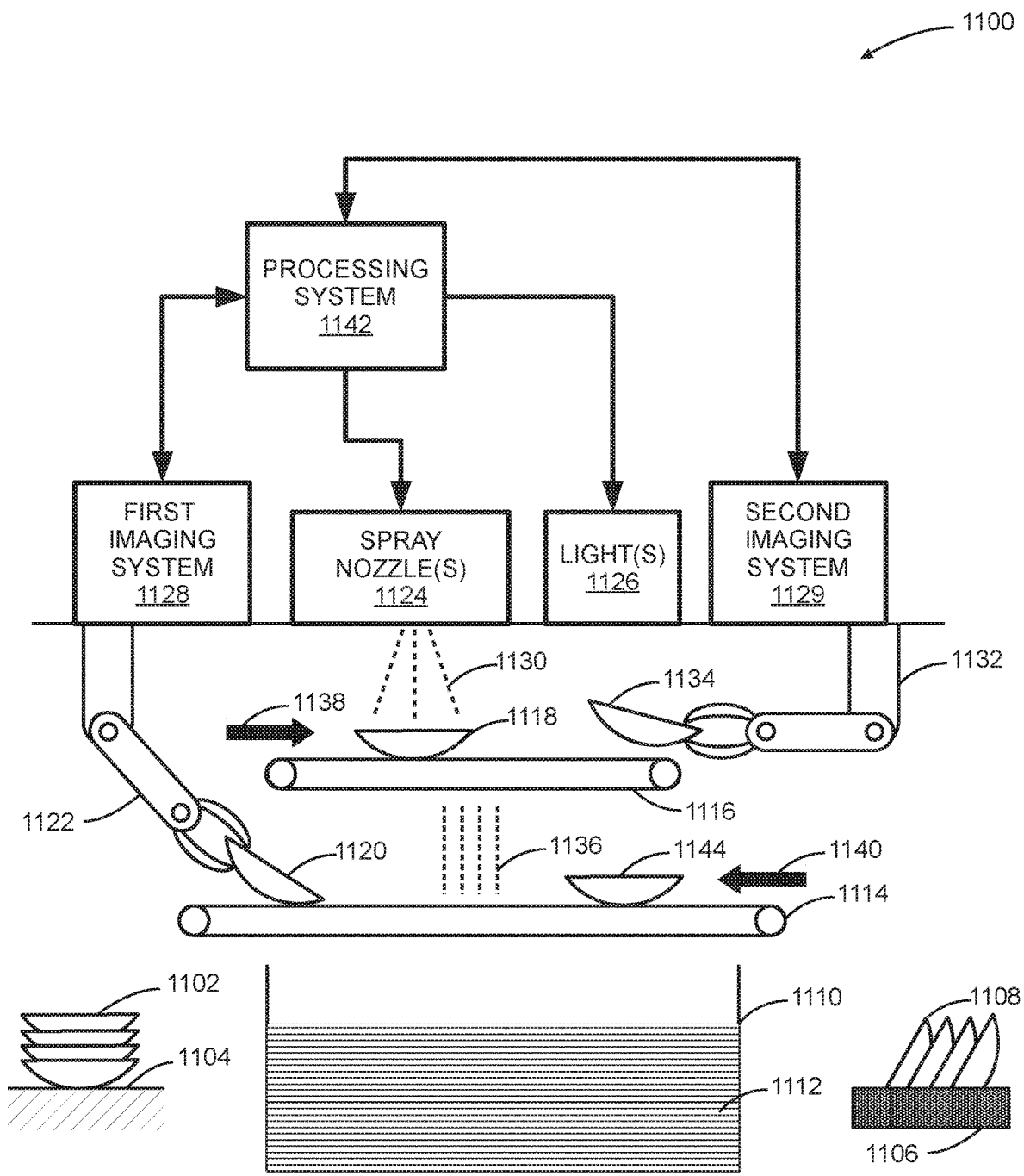
FIG. 11 is a schematic diagram depicting an embodiment of a recirculation system associated with articles of dishware.

FIG. 11 is a schematic diagram depicting an embodiment of a recirculation system 1100 associated with articles of dishware. In some embodiments, recirculation system 1100 includes a first imaging system 1128 and a second imaging system 1129 that are each configured to capture one or more images of an article of dishware. In some embodiments, first imaging system 1128 is configured to capture the one or more images before the article of dishware is washed by, for example, an automated dishwashing system. In particular embodiments, second imaging system 1129 is configured to capture the one or more images after the article of dishware has been washed by the automated dishwashing system.

In some embodiments, each of imaging system 1128 and imaging system 1129 is coupled to a processing system 1142 that is configured to communicate bi-directionally with each of imaging system 1128 and imaging system 1129 via an electrical coupling. In particular embodiments, processing system 1142 is configured to receive images or imaging data from each of imaging system 1128 and imaging system 1129, where the images or imaging data include one or more images of an article of dishware as captured by imaging system 1128 or imaging system 1129. Processing system 1142 may also be configured to issue commands to each of imaging system 1128 and imaging system 1129 that include triggering imaging system 1128 and imaging system 1129 to capture an image, varying exposure settings on each of imaging system 1128 and imaging system 1129, and so on. In some embodiments, imaging system 1128 and imaging system 1129 may include any combination of RGB cameras, UV cameras, hyperspectral imaging cameras, high dynamic range (HDR) cameras, and so on.

In some embodiments, a robotic actuator 1122 is configured to pick up an article of dishware from a stack of soiled dishware 1102 resting on a work surface 1104. In particular embodiments, robotic actuator 1122 may pick up an article of dishware from stack of soiled dishware 1102 and present the article of dishware in a field of view of first imaging system 1128. In some embodiments, first imaging system 1128 is configured to capture one or more images of the article of dishware to determine a presence and location of at least one stain or soil on the article of dishware. This set of one or more images can be referred to as a first set of images. In some embodiments, robotic actuator 1122 may manipulate the article of dishware so as to change a pose of the article of dishware in the field of view of first imaging system 1128. This allows first imaging system 1128 to capture images of different portions of the article of dishware.

After imaging system 1128 captures the first set of images, robotic actuator 1122 places the article of dishware on a first conveyor belt 1116 that is configured to move the article of dishware along a first direction 1138. In some embodiments, first conveyor belt 1116 is also referred to as a "cleaning conveyor belt."

FIG. 11 shows an article of dishware 1118 that has been placed on first conveyor belt 1116 by robotic actuator 1122. First conveyor belt 1116 transports article of dishware 1118 under one or more spray nozzles 1124 that are configured to spray a fluid 1130 onto article of dishware 1118. In some embodiments, spray nozzles 1124 may be include one or more steerable nozzles such as steerable nozzle 410. In some embodiments, fluid 1130 may be a dishwashing solution. In particular embodiments, spray nozzles 1124 may be configured to change a temperature, a pressure, a chemical concentration, a spray duration, or other characteristics of fluid 1130, responsive to commands from processing system 1142. Spray nozzles 1124 essentially attempt to clean article of dishware 1118. In some embodiments, spray nozzles 1124 may be steered to target specific areas on article of dishware 1118, such as a soil or stain that may require additional cleaning as determined by processing system 1142 based on processing the first set of images. In other words, recirculation system 1100 includes targeted cleaning system features that are discussed herein. Processing system 1142 may be configured to use any combination of the systems and methods discussed herein to achieve targeted cleaning of article of dishware 1118.

After cleaning, first conveyor belt 1116 continues to transport an article of dishware along first direction 1138. The article of dishware is picked up by a robotic actuator 1132. For example, in FIG. 11, robotic actuator 1132 is shown to be picking up an article of dishware 1134 that has been washed by spray nozzles 1124. In some embodiments, robotic actuator 1132 is configured to present article of dishware 1134 in a field of view of second imaging system 1129 that is configured to capture one or more images of article of dishware 1134. The one or more images captured by second imaging system 1129 may be referred to as a second set of images. This second set of images is processed by processing system 1142 to determine a presence and location of any stain or soil on article of dishware 1134 that may not have been removed after article of dishware 1134 has been washed by spray nozzles 1124. In some embodiments, processing system 1142 uses the CNN-based systems and methods described herein to determine a presence and location of a stain or soil on article of dishware 1134. In some embodiments, robotic actuator 1132 may manipulate the article of dishware so as to change a pose of the article of dishware in the field of view of second imaging system 1129. This allows second imaging system 1129 to capture images of different portions of the article of dishware. In some embodiments, imaging system 1128 and imaging system 1129 may be optically coupled to one or more optical filters as described herein.

In order to assist first imaging system 1128 and second imaging system 1129 in capturing images of an article of dishware, recirculation system 1100 may include one or more lights 1126 that are configured to illuminate an article of dishware presented in a field of view of first imaging system 1128 or second imaging system 1129 by robotic actuator 1122 or robotic actuator 1132 respectively. In some embodiments, lights 1126 may include any combination of white light, UV lights, infrared lights, or any other light source as described herein.

After processing the second set of images, if processing system 1142 determines that an article of dishware (e.g., article of dishware 1134) is clean, then processing system 1142 commands robotic actuator 1132 to place the article of dishware in a dishrack 1106 containing a set of clean articles of dishware 1108. On the other hand, if processing system 1142 determines that the article of dishware is still stained, soiled or dirty, (i.e., if the article of dishware still contains a stain referred to as a "residual stain"), then processing system 1142 commands robotic actuator 1132 to place the article of dishware on a second conveyor belt 1114 that moves the article of dishware in a second direction 1140, towards robotic actuator 1122. In some embodiments, second conveyor belt 1114 is also referred to as a "recirculation conveyor." FIG. 11 shows an article of dishware 1144 that has been placed by robotic actuator 1132 onto second conveyor belt 1114 being returned to first robotic actuator 1122.

As shown in FIG. 11, robotic actuator 1122 collects articles of dishware such as an article of dishware 1120 off of second conveyor belt 1114 and resubmits, or recirculates the article of dishware for cleaning by restarting the process of presenting the article of dishware in a field of view of first imaging system 1128, and so on. Robotic actuator 1122 is thus configured to submit dirty articles of dishware for washing either by picking up an article of dishware from stack of soiled dishware 1102, or by picking up a still-dirty (after washing) article of dishware off of second conveyor belt 1114. Recirculation system 1100 is a closed-loop system that, when coupled with targeted cleaning approaches as discussed herein, embodies an automated, intelligent dishwashing system that is configured to perform intelligent cleaning on articles of dishware by focusing on specific soiled regions. Intelligence associated with recirculation system 1100 also allows recirculation system 1100 to intelligently determine whether an article of dishware is still soiled after washing and to submit any such soiled article of dishware for rewashing. FIG. 11 also shows drain water 1136 from the dishwashing process from spray nozzles 1124 being collected in a water collection tank 1110 as waste water 1112.

In some embodiments, each of robotic actuator 1122 and robotic actuator 1132 may be any combination of multi degree of freedom robotic arms, gantry robots, multi degree of freedom linear stage assemblies, and so on. In particular embodiments, each of robotic actuator 1122 and robotic actuator 1132 may be controlled by processing system 1142 (associated couplings are not shown in FIG. 11).

In some embodiments, a functionality of recirculation system 1100 may be augmented by an algorithm to decide on very light cleaning or direct passing of articles of dishware based on the classification of the food types, freshness of food soils, and the amount of food soils based on food soil classification methods discussed herein. Such embodiments could be used to optimize the throughput of recirculation system 1100, or the efficiency of energy consumption without compromising cleaning quality. For example, cups with fresh coffee or bowls may be quickly washed by spraying with a small amount of water while cheese baked on a plate may need water focused on the soil for a longer period of time for effective cleaning.

A more general method may combine the estimations before, during and after washing to generate a summary of performance metrics to close the loop to adjust the machine parameters such as water, power, temperature, chemical dosage, and time to optimize desired key metrics such as cleaning quality, throughput, or energy consumption.

Figure 12:
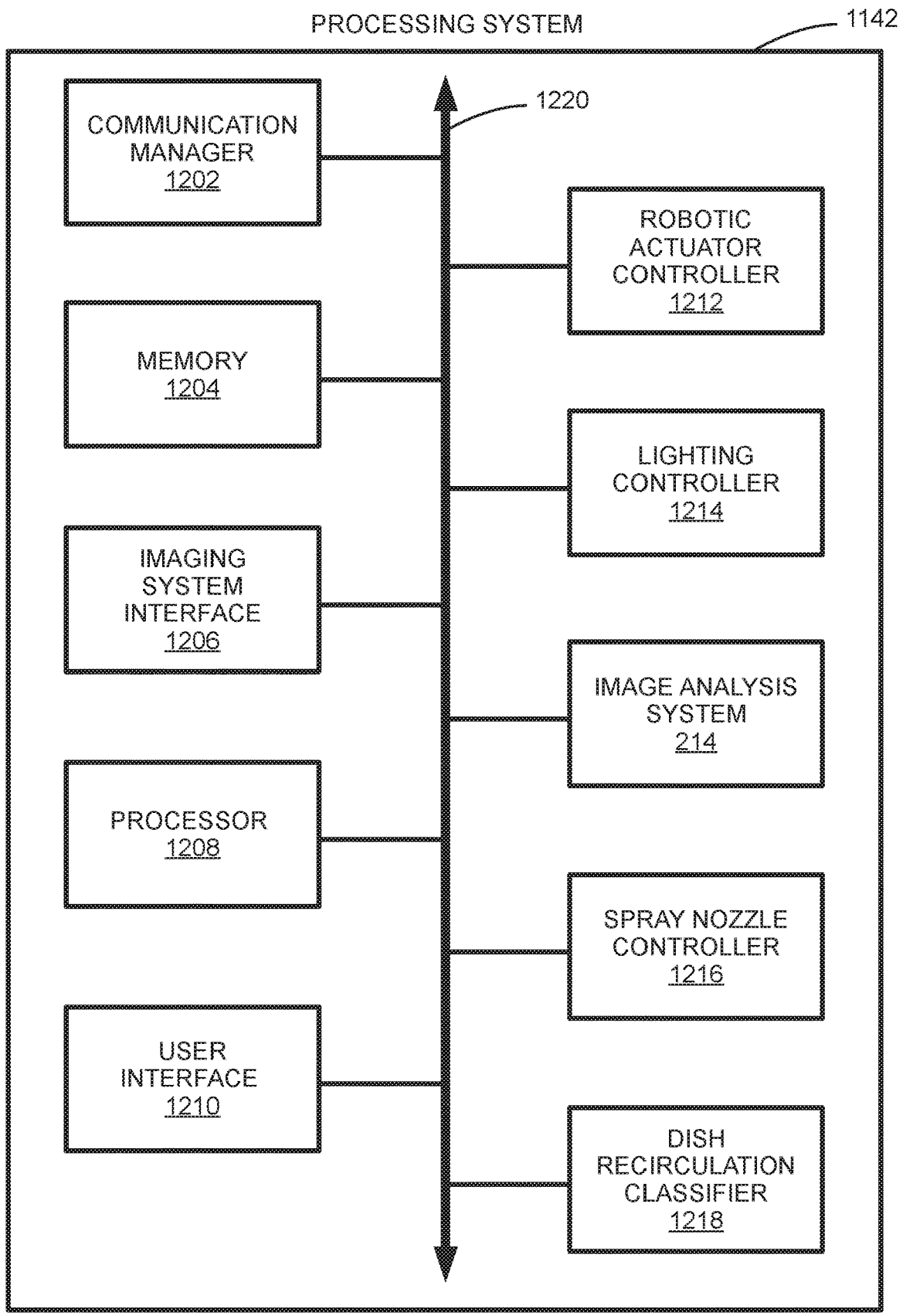
FIG. 12 is a block diagram depicting an embodiment of a processing system capable of operating a recirculation system that is configured to determine whether an article of dishware that has been washed is still dirty, and send the article of dishware back for additional cleaning if the article of dishware is determined to be dirty.

FIG. 12 is a block diagram depicting an embodiment of processing system 1142 capable of operating a recirculation system that is configured to determine whether an article of dishware that has been washed is still dirty, and send the article of dishware back for additional cleaning if the article of dishware is determined to be dirty. In some embodiments, processing system 1142 includes a communication manager 1202 that is configured to manage communication protocols and associated communication with external peripheral devices as well as communication within other components in processing system 1142. For example, communication manager 1202 may be responsible for generating and maintaining an interface between processing system 1142 and first imaging system 1128. Communication manager 1202 may also manage communication between the different components within processing system 1142.

In some embodiments, processing system 1142 includes a memory 1204 that is configured to store data associated with recirculation system 1100. Data stored in memory 1204 may be temporary data or permanent data. In some embodiments, memory 1204 may be implemented using any combination of hard drives, random access memory, read-only memory, flash memory, and so on. In particular embodiments, data stored in memory 1204 may include positioning data associated with robotic actuator 1122, data from first imaging system 1128, and so on.

Processing system 1142 may also include an imaging system interface 1206 that is configured to interface processing system 1142 with one or more imaging systems such as first imaging system 1128 and second imaging system 1129. In some embodiments, imaging system interface 1206 may include any combination of connectivity protocols such as IEEE 1394 (FireWire), Universal Serial Bus (USB), and so on. Imaging system interface 1206 allows processing system 1142 to receive images from an associated imaging system, while also sending commands to the imaging system (e.g., a command to capture an image when an article of dishware is in a particular position in a field of view of the imaging system).

Processing system 1142 may also include a processor 1208 that may be configured to perform functions that may include generalized processing functions, arithmetic functions, and so on. Processor 1208 may also be configured to perform three-dimensional geometric calculations and solve navigation equations in order to determine relative positions, trajectories, and other motion-related and position-related parameters associated with manipulating an object by a robotic actuator.

A user interface 1210 may be included in processing system 1142. In some embodiments, user interface 1210 is configured to receive commands from a user or display information to the user. For example, commands received from a user may be basic on/off commands, and may include variable operational speeds. Information displayed to a user by user interface 1210 may include, for example, system health information and diagnostics. User interface 1210 may include interfaces to one or more switches or push buttons, and may also include interfaces to touch-sensitive display screens. In some embodiments, user interface 1210 may allow a user to annotate an image of an article of dishware as described herein. This annotation may be performed, for example, via a touchscreen, or a combination of a keyboard/mouse interface and a visual display monitor.

In some embodiments, processing system 1142 includes a robotic actuator controller 1212 that is configured to output actuation commands to a robotic actuator such as robotic actuator 1122. The commands output by robotic actuator controller 1212 may include positioning commands, object gripping commands, object release commands, object repositioning commands, and so on.

In some embodiments, processing system 1142 includes a lighting controller 1214 that is configured to alter any characteristics of light used to illuminate an article of dishware that is being imaged by an imaging system. Lighting controller 1214 may be configured to switch between different light sources, turn different light sources on or off, or configure physically-actuated optical filters in an incident or reflected light path as discussed herein. Details of lighting controller 1214 are provided herein.

In some embodiments, processing system 1142 includes image analysis system 214 that is configured to process images of an article of dishware captured by, for example, imaging system 1128 to determine a presence of a stain, soil or dirt on an article of dishware. Image analysis system 214 may include subsystems that implement convolutional neural network (CNN) based algorithms for processing the images, as discussed herein. A data bus 1216 interconnects all subsystems associated with processing system 1142, transferring data and commands within processing system 1142.

In some embodiments, processing system 1142 includes a spray nozzle controller 1216 that is configured to control a position of nozzles 1124, as well as characteristics (e.g., temperature and pressure) of fluid 1130 dispensed by nozzles 1124. Details of spray nozzle controller 1216 are provided herein.

Some embodiments of processing system 1142 may include a dish recirculation classifier 1218 that is configured to determine, responsive to processing system 1142 analyzing images of an article of dishware post-wash, whether the article of dishware is dirty or clean. This determination is done using, for example, the CNN-based systems and method described herein. If an article of dishware is determined to be clean, the article of dishware is placed in a dishrack such as dishrack 1106. If the article of dishware is determined to be dirty, the article of dishware is sent (or "recirculated") back to the start of the cleaning process.

Figure 13:
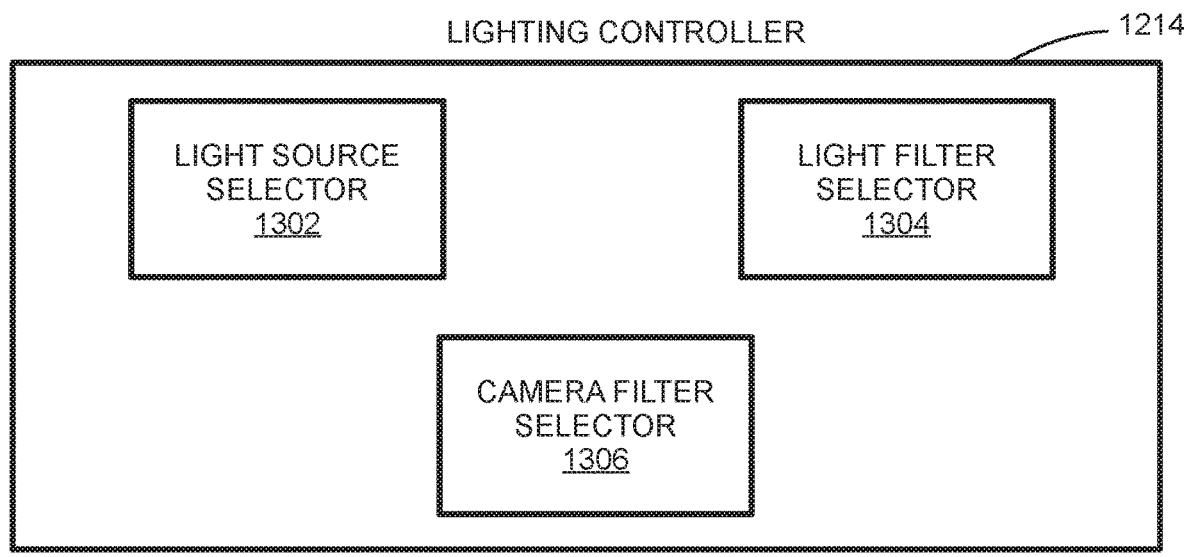
FIG. 13 is a block diagram depicting an embodiment of a lighting controller.

FIG. 13 is a block diagram depicting an embodiment of a lighting controller 1214. In some embodiments, lighting controller 1214 is configured to switch between different light sources, turn different light sources on or off, or configure physically-actuated optical filters in an incident or reflected light path. In some embodiments, lighting controller 1214 includes a light source selector 1302 that is configured to select between a plurality of light sources such as UV light sources, IR light sources, white light sources, and so on. In some embodiments, light source selector 1302 may turn on a single light source at a time. In other embodiments, light source selector 1302 may turn on multiple, or all, light sources at a time. Light source selector 1302 allows for illuminating an article of dishware with different kinds of light to capture images of the article of dishware in diverse light conditions. This enables an associated stain detection system to detect and classify a stain or soil on the article of dishware with a higher probability of success.

In some embodiments, lighting controller includes a light filter selector 1304 that is configured to insert, remove, or change one or more optical filters (such as optical filter 108) in an incident light path such as incident light path 112. Light filter selector 1304 is essentially configured to switch between different filters (e.g., UV filters, polarizing filters, and so on) placed between a light source and an article of dishware.

In some embodiments, lighting controller includes a camera filter selector 1306 that is configured to insert, remove, or change one or more optical filters (such as optical filter 108) in a reflected light path such as reflected light path 114. Camera filter selector 1306 is essentially configured to switch between different filters (e.g., UV filters, polarizing filters, and so on) placed between an article of dishware and an imaging system.

In some embodiments, light filter selector 1304 and camera filter selector 1306 may use mechanical actuators or robotic actuators to perform their respective filter switching operations.

Figure 14:
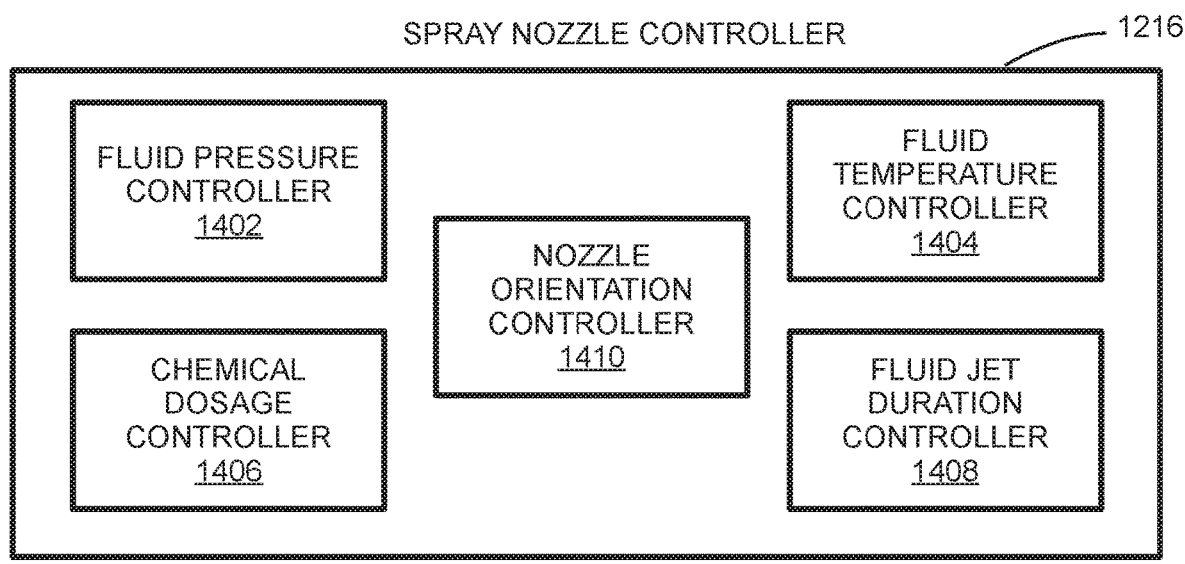
FIG. 14 is a block diagram depicting an embodiment of a spray nozzle controller.

FIG. 14 is a block diagram depicting an embodiment of a spray nozzle controller 1216. In some embodiments, spray nozzle controller 1216 is configured to control operations of spray nozzles 1124 and vary characteristics of fluid 1130. Specifically, spray nozzle controller 1216 is configured to implement a targeted cleaning functionality. Some embodiments of spray nozzle controller 1216 include a fluid pressure controller 1402 that is configured to control a pressure associated with fluid 1130. The pressure of fluid 1130 varied responsive to a characterization of an associated stain or soil on an article of dishware, using the systems and methods described herein.

In some embodiments, spray nozzle controller 1216 includes a fluid temperature controller 1404 that is configured to vary a temperature of fluid 1130 in accordance with feedback from image analysis system 214. Fluid temperature controller 1404 further adds to targeted cleaning by adapting the temperature of fluid 1130 in accordance with a characterization of a stain on an article of dishware.

Spray nozzle controller 1216 may also include a chemical dosage controller 1406 that is configured to vary a composition of fluid 1130. In some embodiments, fluid 1130 may be comprised of water, dishwashing liquid, rinsing agents, and other similar dishwashing agents. Chemical dosage controller 1406 alters the composition of fluid 1130 responsive to feedback from image analysis system 214 as a part of targeted cleaning. In some embodiments, image analysis system 214 may be configured to alter the composition of fluid 1130 (or fluid 422) responsive to image analysis system 214 determining a nature of the stain on the article of dishware. For example, cleaning a stain associated with starch may entail treating the stain with a longer duration using hot water. On the other hand, a stain associated with oil or protein may require that a surfactant be included in fluid 1130 to effectively dissolve and remove the stain.

In some embodiments, a duration for which fluid 1130 is sprayed on an article of dishware is controlled by a fluid jet duration controller 1408 that is included in spray nozzle controller 1216. Controlling a fluid jet duration in this way is an aspect of the targeted cleaning approach discussed herein. In some embodiments, spray nozzle controller 1216 includes a nozzle orientation controller 1410 that is configured to control an orientation or spray direction of spray nozzles 1124. In some embodiments, spray nozzles 1124 include one or more steerable nozzles such as steerable nozzle 410. Nozzle orientation controller 1410 may be configured to independently steer any steerable nozzles associated with spray nozzles 1124 as a part of a targeted cleaning process.

Figure 15A:
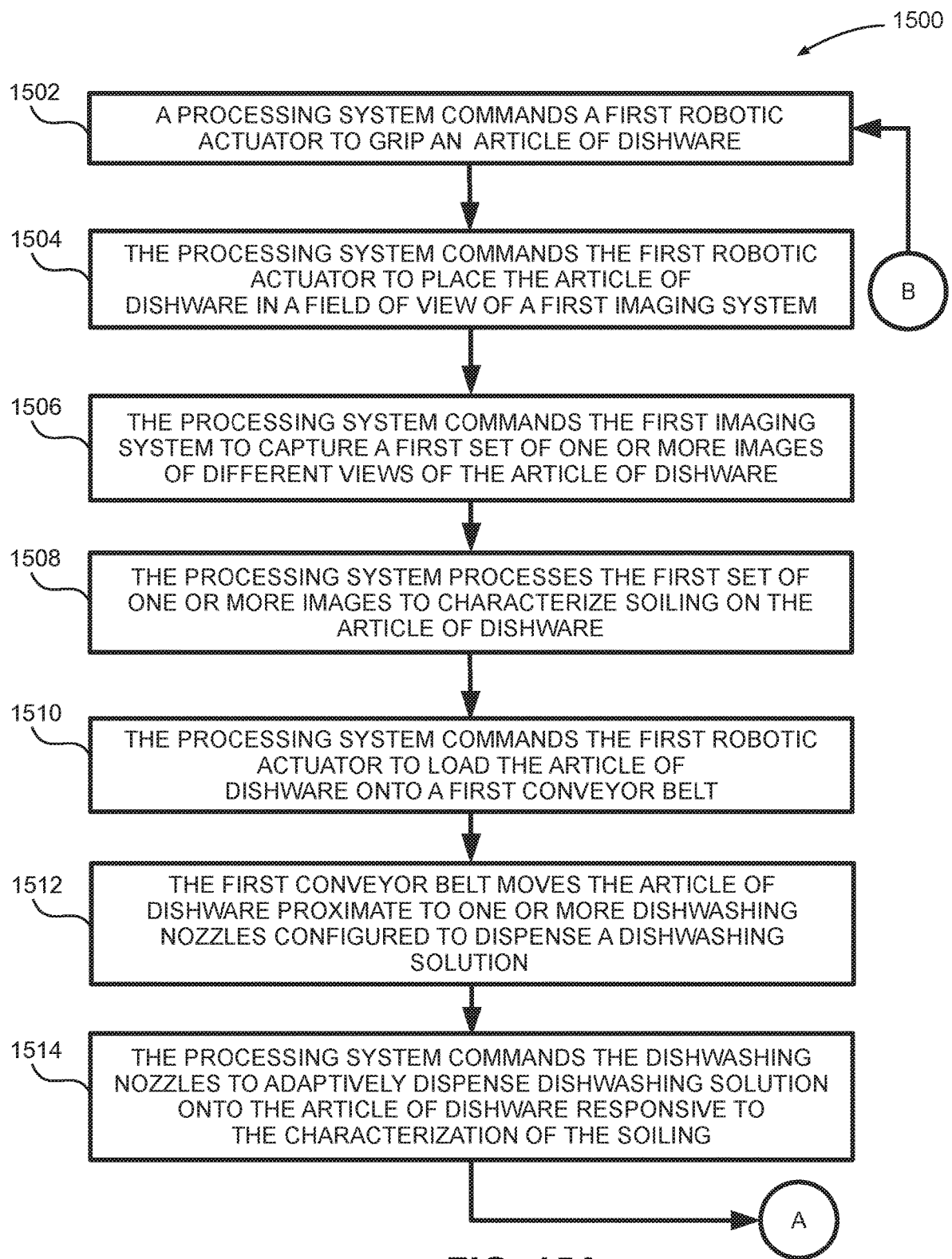
FIGS. 15A and 15B are flow diagrams depicting an embodiment of a method of recirculating articles of dishware.

FIG. 15A is a flow diagram depicting an embodiment of a method 1500 of recirculating articles of dishware. Method 1500 is associated with operation of recirculation system 1100. In some embodiments, at 1502, a processing system (e.g., processing system 1142) commands a first robotic actuator (e.g., robotic actuator 1122) to grip an article of dishware. The process of gripping an article of dishware is synonymous with robotic actuator 1122 picking up an article of dishware. In some embodiments, the article of dishware is a soiled article of dishware. At 1504, the processing system commands the first robotic actuator to place the article of dishware in a field of view of a first imaging system (e.g., first imaging system 1128). Next, at 1506, the processing system commands the first imaging system to capture a first set of one or more images of different views of the article of dishware. This step is similar to robotic actuator 1122 holding an article of dishware in a field of view of imaging system 1128. In some embodiments, the first robotic actuator may change an orientation of the article of dishware as viewed by the first imaging system over a series of images so that the first imaging system captures images of different portions of the article of dishware. At 1508, the processing system processes the first set of one or more images to characterize soiling on the article of dishware. This step is associated with operations of a stain detection system such as stain detection system 100, and may use the CNN-based systems and methods described herein.

At 1510, the processing system commands the first robotic actuator to load the article of dishware onto a first conveyor belt (e.g., first conveyor belt 1116). At 1512, the first conveyor belt moves the article of dishware proximate to one or more dishwashing nozzles configured to dispense a dishwashing solution. In some embodiments, the dishwashing nozzles are identical to spray nozzles 1124, and the dishwashing solution is dispensed as fluid 1130. Next, at 1514 the processing system commands the dishwashing nozzles to adaptively dispense dishwashing solution onto the article of dishware responsive to the characterization of the soiling. This step corresponds to targeted cleaning, where adaptive dispensing of dishwashing solution involves altering a temperature, a pressure, a chemical concentration or a spray duration of the dishwashing solution. In some embodiments, one or more of the dishwashing nozzles may be steerable nozzles similar to steerable nozzle 410 that are configured to move or pivot on commands from the processing system, to target specific soiled regions on the article of dishware. Method 1500 then goes to A, with a continued description below.

Figure 15B:
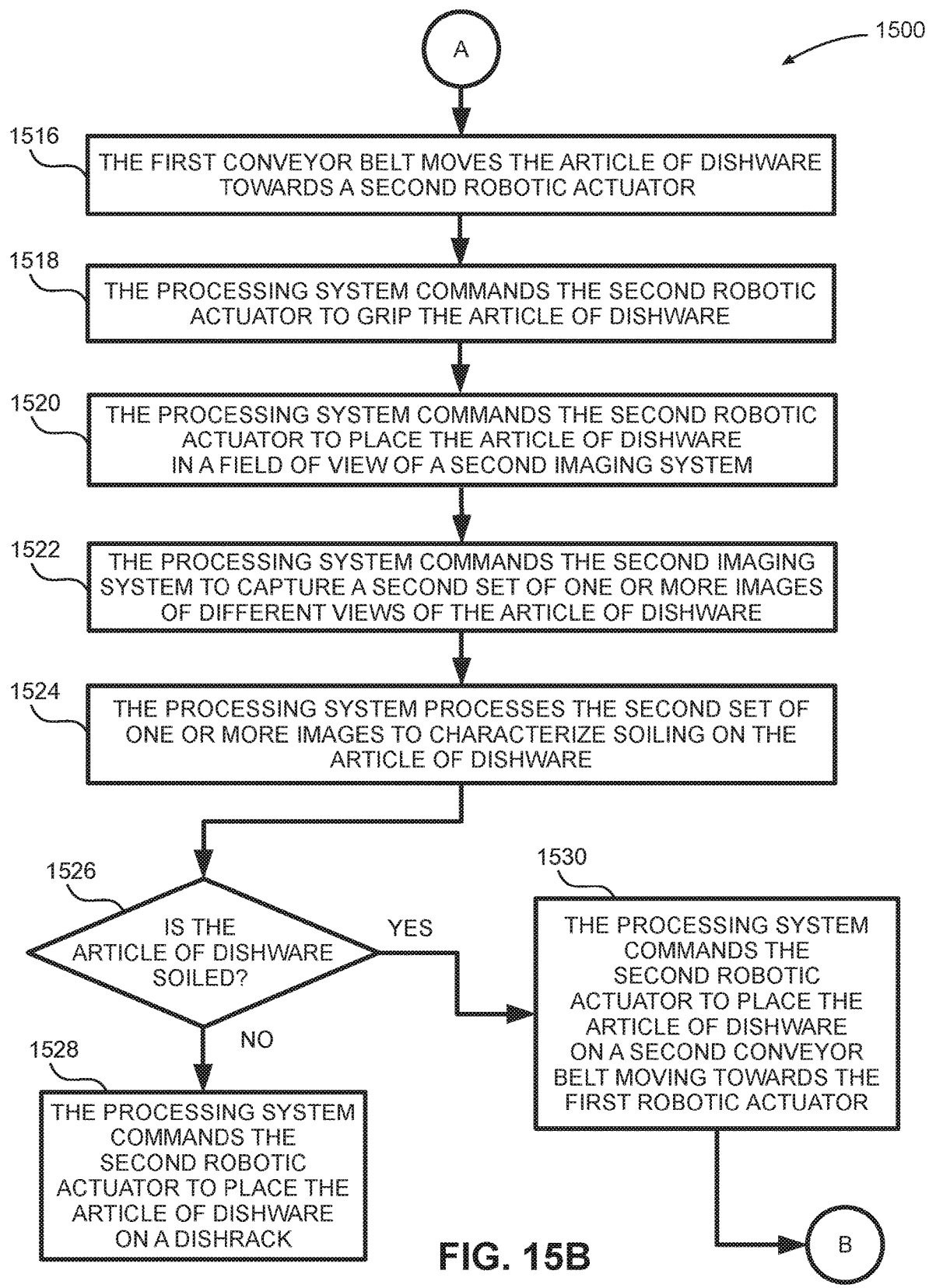

FIG. 15B is a continued description of method 1500. Starting at A, method 1500 goes to 1516, where the first conveyor belt moves the article of dishware towards a second robotic actuator (e.g., robotic actuator 1132). Next, at 1518, the processing system commands the second robotic actuator to grip the article of dishware. At 1520, the processing system commands the second robotic actuator to place the article of dishware in a field of view of a second imaging system (e.g., second imaging system 1129). At 1522, the processing system commands the second imaging system to capture a second set of one or more images of different views of the article of dishware. In some embodiments, the second robotic actuator may change an orientation of the article of dishware as viewed by the second imaging system over a series of images so that the second imaging system captures images of different portions of the article of dishware. At 1524, the processing system processes the second set of one or more images to characterize soiling on the article of dishware. In some embodiments, this characterization may be performed by image analysis system 214 and the associated subsystems. At 1526, responsive to the characterization, method 1500 checks to see whether the article of dishware is soiled. Such a soiling is also referred to as a "residual stain." If the article of dishware is not soiled, then the method goes to 1530, where the processing system commands the second robotic actuator to place the article of dishware on a dishrack. On the other hand if, at 1526, the article of dishware is soiled, then the method goes to 1528, where the processing system commands the second robotic actuator to place the article of dishware on a second conveyor belt (e.g., second conveyor belt 1114) moving towards the first robotic actuator. The method 1500 then goes to B, and returns to 1502, where the sequence repeats till method 1500 determines that the article of dishware is not soiled.

In some embodiments, after step 1514, rather than moving the article of dishware towards the second robotic actuator, the article of dishware is left proximate to the one or more dishwashing nozzles (the region proximate to the one or more dishwashing nozzles is also referred to as a "cleaning section" or "cleaning area"). The second imaging system may then capture the second set of one or more images of different views of the article of dishware. This second set of images is analyzed to determine whether the article of dishware is soiled. If the article of dishware is soiled then the article of dishware is left in the cleaning section, and the cleaning process (i.e., step 1514) repeats, and so on, until analysis of the second set of images determines that the article of dishware is clean. Once the article of dishware is determined to be clean, the first conveyor belt moves the article of dishware towards the second robotic actuator, which is commanded by the processing system to place the article of dishware on the dishrack.

Figure 16:
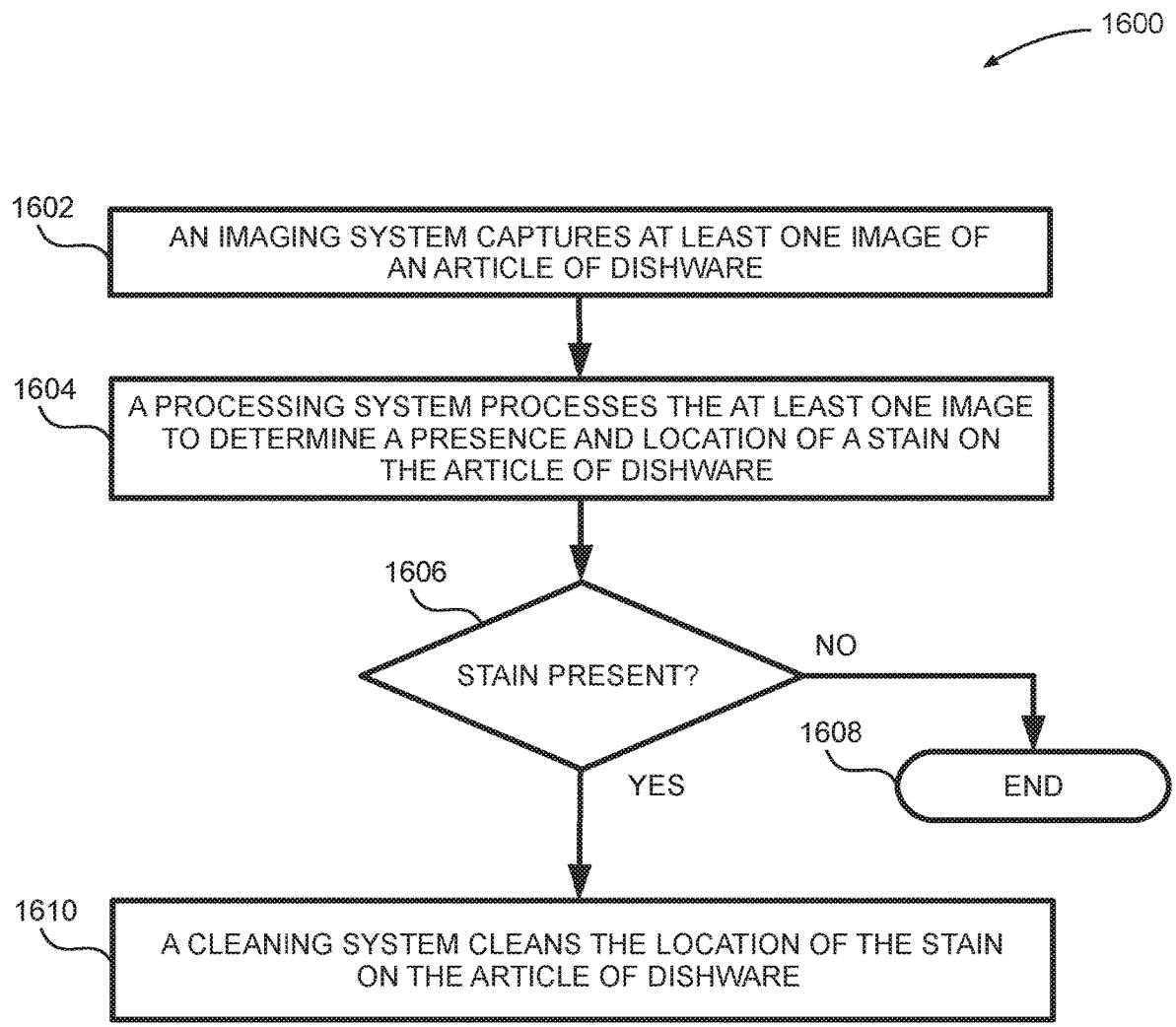
FIG. 16 is a flow diagram depicting an embodiment of a method to perform targeted cleaning on an article of dishware.

FIG. 16 is a flow diagram depicting an embodiment of a method 1600 to perform targeted cleaning on an article of dishware. At 1602, an imaging system captures at least one image of an article of dishware. At 1604, a processing system processes the at least one image to determine a presence and location of a stain on the article of dishware. In some embodiments the processing system is similar to processing system 106. At 1606, the method checks to determine if a stain is present on the article of dishware using the stain detection systems and method described herein. In some embodiments, this function may be performed by image analysis system 214. If a stain is not present on the article of dishware, method 1600 ends at 1608. If a stain is present on the article of dishware, the method goes to 1610, where a cleaning system cleans the location of the stain on the article of dishware. In some embodiments, a functionality of method 1600 is embodied by targeted cleaning system 400.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
a light source configured to illuminate an article of dishware;
an imaging system configured to capture at least two images of the article of dishware; and
a processing system configured to analyze the at least two one images to determine a presence of food soils on the article of dishware;
further comprising an optical filter system optically coupled to the light source or the imaging system, wherein the optical filter system is configured to change the characteristics of light transmitted through the optical filter system, wherein the optical filter system includes a first polarizing filter and a second polarizing filter, wherein a configuration of the first polarizing filter is different from a configuration of the second polarizing filter;
wherein the configurations of the first and second polarizing filters result in a first image and a second image having different specular reflections on different parts of the first and second images while signals corresponding to food soils on the article of dishware stay in the same spot on the first and second images; and
wherein the analyzing comprises analyzing the first image and the second image to determine the presence of food soils on the article of dishware by separating signals in the first and second images that are in the same spot on the first and second images from specular reflections that are on different parts of the first and second images.

2. The apparatus of claim 1, further comprising a robotic actuator configured to change a pose of the article of dishware as viewed by the imaging system, wherein changing the pose of the article of dishware enables the imaging system to capture images of different portions of the article of dishware.

3. The apparatus of claim 1, further comprising a plurality of light sources, wherein each of the plurality of light sources is configured to emit light with specific characteristics.

4. The apparatus of claim 1, further comprising a plurality of imaging systems, wherein each of the plurality of imaging systems is configured to capture an image of a substantially separate portion of the article of dishware.

5. The apparatus of claim 1, wherein the analysis is performed by a convolutional neural network associated with the processing system.

6. The apparatus of claim 1, wherein the processing system is further configured to detect a presence of a defect on the article of dishware.

7. The apparatus of claim 1, wherein the food soils are delineated by the processing system using at least one of a bounding box, a contour, or a polygon.

8. The apparatus of claim 1, further comprising a cleanliness quantifier that is configured to determine a scale of cleanliness associated with the food soils.

9. The apparatus of claim 1, further comprising a freshness estimator that is configured to determine an approximate age of the food soils.

10. A method comprising:
illuminating an article of dishware;
capturing, by an imaging system, at least two images of the article of dishware;
analyzing, by a processing system, the at least two images to determine a presence of food soils on the article of dishware; and
further comprising:
capturing a first image of the article of dishware via the imaging system and a first polarizing filter;
capturing a second image of the article of dishware via the imaging system and a second polarizing filter, wherein a configuration of the first polarizing filter is different from a configuration of the second polarizing filter, wherein the configurations of the first and second polarizing filters result in the first image and the second image having different specular reflections on different parts of the first and second images while signals corresponding to food soils on the article of dishware stay in the same spot on the first and second images; and
wherein the analyzing comprises analyzing the first image and the second image to determine the presence of food soils on the article of dishware by separating signals in the first and second images that are in the same spot on the first and second images from specular reflections that are on different parts of the first and second images.

11. The method of claim 10, further comprising changing a pose of the article of dishware as viewed by the imaging system, wherein changing the pose of the article of dishware enables the imaging system to capture images of different portions of the article of dishware.

12. The method of claim 10, further comprising filtering the light source, wherein the filtering changes the characteristics of light illuminating the article of dishware.

13. The method of claim 10, wherein the analysis is performed by implementing deep learning algorithms.

14. The method of claim 10, wherein the food soils are delineated by at least one of a bounding box, a contour, or a polygon.

15. The method of claim 10, further comprising determining a cleanliness quantifier that is associated with the food soils.

16. The method of claim 10, further comprising determining a freshness estimator associated with an approximate age of the food soils.

17. A method comprising:
illuminating an article of dishware;
capturing a first image of the article of dishware via a first polarizing filter;
capturing a second image of the article of dishware via a second polarizing filter, wherein a configuration of the first polarizing filter is different from a configuration of the second polarizing filter and wherein the configurations of the first and second polarizing filters result in the first image and the second image having different specular reflections on different parts of the first and second images while signals corresponding to food soils on the article of dishware stay in the same spot on the first and second images; and
analyzing, by a processing system, the first image and the second image captured by the camera of the imaging system to determine a presence of food soils on the article of dishware by separating signals in the first and second images that are in the same spot on the first and second images from specular reflections that are on different parts of the first and second images.

* * * * *